United States Patent
Chopra et al.

(10) Patent No.: US 11,318,828 B2
(45) Date of Patent: May 3, 2022

(54) AXLE ASSEMBLY FOR FRAME RAIL VEHICLES

(71) Applicant: ALLISON TRANSMISSION, INC., Indianapolis, IN (US)

(72) Inventors: Vikram Chopra, Troy, MI (US); Shaun Mepham, Clarkston, MI (US); Christopher G. Baillie, Lake Orion, MI (US); Siva Srinivas Rajeev Mupparti, Madison Heights, MI (US)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 0 days.

(21) Appl. No.: 16/971,112

(22) PCT Filed: Feb. 19, 2019

(86) PCT No.: PCT/US2019/018590
§ 371 (c)(1),
(2) Date: Aug. 19, 2020

(87) PCT Pub. No.: WO2019/161390
PCT Pub. Date: Aug. 22, 2019

(65) Prior Publication Data
US 2021/0008969 A1   Jan. 14, 2021

Related U.S. Application Data

(60) Provisional application No. 62/632,214, filed on Feb. 19, 2018, provisional application No. 62/632,224, (Continued)

(51) Int. Cl.
*B60K 1/02* (2006.01)
*B60K 17/16* (2006.01)
(Continued)

(52) U.S. Cl.
CPC .............. *B60K 1/02* (2013.01); *B60K 17/165* (2013.01); *B60K 17/08* (2013.01);
(Continued)

(58) Field of Classification Search
CPC ........ B60K 1/02; B60K 17/165; B60K 17/08; B60K 2007/003; B60K 2007/0038;
(Continued)

(56) References Cited

U.S. PATENT DOCUMENTS 9,958,049 B1 * 5/2018 Sten ........................ F16H 48/36
2005/0023053 A1   2/2005 Bennett
(Continued)

FOREIGN PATENT DOCUMENTS

CN   103072474 A   5/2013
CN   206749500 U   12/2017
(Continued)

OTHER PUBLICATIONS

PCT Search Report and Written Opinion prepared for PCT/US2019/018590, completed Apr. 1, 2019.
(Continued)

*Primary Examiner* — Justin Holmes
(74) *Attorney, Agent, or Firm* — Barnes & Thornburg LLP

(57) ABSTRACT

An axle assembly for frame rail vehicles is described herein. The axle assembly includes a first axle shaft and a second axle shaft orientated along a first axis of rotation. A first electric machine is orientated along a second axis of rotation and a second electric machine is spaced from the first electric machine and orientated along a third axis of rotation. A differential gear set is disposed about the first axis of rotation and is coupled to and driven by a common gear reduction to transfer rotational torque from the first and second electric machines to the first and second axle shafts.

(Continued)

A speed change mechanism is coupled between the common gear reduction and the differential gear set to change the rotational torque transferred to the first and second axle shafts.

19 Claims, 34 Drawing Sheets

Related U.S. Application Data filed on Feb. 19, 2018, provisional application No. 62/632,184, filed on Feb. 19, 2018, provisional application No. 62/639,355, filed on Mar. 6, 2018, provisional application No. 62/682,679, filed on Jun. 8, 2018.

(51) Int. Cl.
*B60K 17/08* (2006.01)
*B60K 7/00* (2006.01)

(52) U.S. Cl.
CPC ................. *B60K 2007/003* (2013.01); *B60K 2007/0038* (2013.01); *B60Y 2400/73* (2013.01)

(58) Field of Classification Search
CPC .......... B60K 2007/0061; B60K 7/0007; B60K 1/00; B60Y 2400/73; B60B 35/122; B60B 35/14; B60B 35/12
See application file for complete search history.

(56) References Cited

U.S. PATENT DOCUMENTS

| | | |
|---|---|---|
| 2005/0023885 A1 | 2/2005 | Bennett |
| 2006/0054368 A1 | 3/2006 | Varela |
| 2006/0094552 A1 | 5/2006 | Duncan |
| 2015/0152954 A1* | 6/2015 | Kajikawa ............ F16H 57/0457 475/150 |
| 2017/0023114 A1 | 1/2017 | Wang et al. |
| 2017/0307058 A1 | 10/2017 | Chu |
| 2017/0313182 A1 | 11/2017 | Isono et al. |
| 2018/0201253 A1* | 7/2018 | Fujita ..................... B60K 6/445 |
| 2018/0236998 A1* | 8/2018 | Ono ..................... B60W 10/02 |
| 2018/0345786 A1 | 12/2018 | Kucharski |
| 2021/0086558 A1* | 3/2021 | Baillie ................. B60K 17/165 |

FOREIGN PATENT DOCUMENTS

| | | |
|---|---|---|
| DE | 102011088647 A1 | 6/2013 |
| WO | 2017080571 A1 | 5/2017 |
| WO | WO2017193130 | 11/2017 |
| WO | WO2019035042 | 2/2019 |

OTHER PUBLICATIONS

Extended European Search Report for European Application No. 19754087.5-1012, dated Nov. 19, 2021, 5 pages.
Extended European Search Report for European Application No. 19753673.3-1012, dated Nov. 19, 2021 5 pages.

* cited by examiner

AXLE ASSEMBLY FOR FRAME RAIL VEHICLES

CROSS-REFERENCE TO RELATED APPLICATION

This application is the U.S. national phase of PCT/US2019/018590, filed on Feb. 19, 2019, which claims priority to U.S. Provisional Application No. 62/632,184, filed Feb. 19, 2018, U.S. Provisional Application No. 62/632,214, filed Feb. 19, 2018, U.S. Provisional Application No. 62/632,224, filed Feb. 19, 2018, U.S. Provisional Application No. 62/639,355, filed Mar. 6, 2018, and U.S. Provisional Application No. 62/682,679, filed Jun. 8, 2018, the disclosures of which are hereby incorporated by reference in its entirety for all purposes.

FIELD OF THE DISCLOSURE

The present invention relates to vehicle axle assemblies, and more particularly, to an axle assembly for use with frame rail vehicles.

BACKGROUND

Many vehicles utilize a beam axle to support the vehicle. At least some of these axles are a drive axle capable of propelling the vehicle. Typically, an internal combustion engine is coupled to the drive axle via a driveshaft. Increasingly, manufacturers have turned to electric and hybrid propulsion systems for increased performance and efficiency.

Accordingly, there is a need to provide an axle assembly that allows one or more electric machines to be packaged into the vehicle while optimizing efficiency and performance.

The present invention is aimed at one or more of the problems identified above.

SUMMARY OF THE INVENTION

Accordingly, the present invention provides an axle assembly for a vehicle with increased performance and efficiency.

In one embodiment of the present invention, an axle assembly is provided. The axle assembly includes a first axle shaft orientated along a first axis of rotation and a second axle shaft orientated along the first axis of rotation with the first and second axle shafts extending in opposite directions. A first electric machine is orientated along a second axis of rotation that is substantially parallel with the first axis of rotation. A second electric machine is spaced from the first electric machine and orientated along a third axis of rotation that is substantially parallel with the first axis of rotation. A common gear reduction is rotatable about a fourth axis of rotation and is driven by the first and second electric machines. A differential gear set is disposed about the first axis of rotation and is coupled to and driven by the common gear reduction to transfer rotational torque from the first and second electric machines to the first and second axle shafts. A speed change mechanism is coupled between the common gear reduction and the differential gear set to change the rotational torque transferred to the first and second axle shafts. The speed change mechanism includes a reduction gear set and an output gear set. The reduction gear set is rotatable about the first axis of rotation and driven by the common gear reduction. The output gear set is rotatable about a fifth axis of rotation that is substantially parallel with the first axis of rotation and driven by the reduction gear set.

In another embodiment of the present invention, an axle assembly is provided. The axle assembly includes a first axle shaft orientated along a first axis of rotation and a second axle shaft orientated along the first axis of rotation with the first and second axle shafts extending in opposite directions. A first electric machine is orientated along a second axis of rotation substantially parallel with the first axis of rotation. A second electric machine is spaced from the first electric machine and is orientated along a third axis of rotation that is substantially parallel with the first axis of rotation. A common gear reduction is rotatable about a fourth axis of rotation and is driven by the first and second electric machines. A differential gear set is coupled to and driven by the common gear reduction to transfer rotational torque from the first and second electric machines to the first and second axle shafts. A speed change mechanism is coupled between the common gear reduction and the differential gear set to change the rotational torque transferred to the first and second axle shafts. The axle assembly also includes a drive unit housing that includes an inner surface defining an interior cavity enclosing the first and second electric machines, the common gear reduction, the differential gear set, and the speed change mechanism with the first and second axle shafts partially disposed within the interior cavity and extending out of the drive unit housing. The interior cavity of the drive unit housing includes a central cavity, a lower cavity, a first machine cavity, and a second machine cavity. The central cavity includes the fourth axis of rotation of the common gear reduction and the first axis of rotation of the first and second axle shafts disposed within the central cavity. The lower cavity is disposed below the central cavity and is configured to accumulate a volume of gearbox fluid with the speed change mechanism at least partially immersed in the lower cavity and the first and second electric machines spaced from the lower cavity. The first machine cavity is disposed above the lower cavity and adjacent the central cavity on one side of the first axis of rotation with the second axis of rotation of the first electric machine disposed within the first machine cavity. The second machine cavity is disposed above the lower cavity and adjacent the central cavity on an opposing side of the first axis of rotation from the first machine cavity. The second machine cavity is at least partially above the first machine cavity with the third axis of rotation of the second electric machine disposed within the second machine cavity.

In yet another embodiment of the present invention, an axle assembly is provided. The axle assembly, includes a first axle shaft orientated along a first axis of rotation and a second axle shaft orientated along the first axis of rotation with the first and second axle shafts extending in opposite directions. A first electric machine is orientated along a second axis of rotation that is substantially parallel with the first axis of rotation. A gear reduction is driven by the first electric machine. A differential gear set is coupled to and driven by the gear reduction to transfer rotational torque from the first electric machine to the first and second axle shafts. The axle assembly also includes a drive unit housing that has first and second sides and upper and lower portions enclosing the first electric machine, the gear reduction, and the differential gear set. The first axle shaft is partially disposed within the drive unit housing and extends out of the first side of the drive unit housing, and the second axle shaft is partially disposed within the drive unit housing and extends out of the second side of the drive unit housing. A first support member is mounted to the first side of the drive unit housing and has a first flange extending to the lower portion of the drive unit housing. A second support member is mounted to the second side of the drive unit housing and has a second flange extending to the lower portion of the drive unit housing. The lower portion of the drive unit housing also defines a plurality of interior support cavities extending though the drive unit housing from the first side to the second side. A plurality of fasteners are inserted through the interior support cavities and are mounted to both of the first and second flanges such that forces experienced by the drive unit housing are transferred to the first and second support members.

In a further embodiment, a vehicle assembly is provided. The vehicle assembly includes a frame rail assembly that includes a pair of parallel frame rails that are orientated along a longitudinal axis and spaced a distance apart along a perpendicular transverse axis. A plurality of cross beams are coupled between the pair of parallel frame rails. The plurality of cross beams includes a first cross beam and a second cross beam that is spaced from the first cross beam along the longitudinal axis such that an equipment cavity is defined between interior surfaces of the pair of parallel frame rails, the first cross beam, and the second cross beam. A plurality of suspension components are mounted to the pair of parallel frame rails and positioned within the equipment cavity. The vehicle assembly also includes an axle assembly. The axle assembly includes a first axle shaft that is orientated along a first axis of rotation substantially parallel to the transverse axis, and a second axle shaft that is orientated along the first axis of rotation with the first and second axle shafts extending in opposite directions. A first electric machine is orientated along a second axis of rotation substantially parallel with the first axis of rotation. A second electric machine is spaced from the first electric machine and orientated along a third axis of rotation substantially parallel with the first axis of rotation. A common gear reduction is rotatable about a fourth axis of rotation and driven by the first and second electric machines. A differential gear set is coupled to and driven by the common gear reduction to transfer rotational torque from the first and second electric machines to the first and second axle shafts. A speed change mechanism is coupled between the common gear reduction and the differential gear set to change the rotational torque transferred to the first and second axle shaft. The axle assembly also includes a drive unit housing having first and second sides and upper and lower portions enclosing the first and second electric machines, the common gear reduction, the differential gear set, and the speed change mechanism. The first axle shaft is partially disposed within the drive unit housing and extends out of the first side of the drive unit housing. The second axle shaft is partially disposed within the drive unit housing and extending out of the second side of the drive unit housing. The drive unit housing is mounted to the frame rail assembly such that the drive unit housing is positioned within the equipment cavity and orientated below a horizontal plane defined by the first and second cross beams.

BRIEF DESCRIPTION OF THE DRAWINGS

Advantages of the present invention will be readily appreciated as the same becomes better understood by reference to the following detailed description when considered in connection with the accompanying drawings.

Corresponding reference characters indicate corresponding parts throughout the drawings.

DETAILED DESCRIPTION

Figure 1:
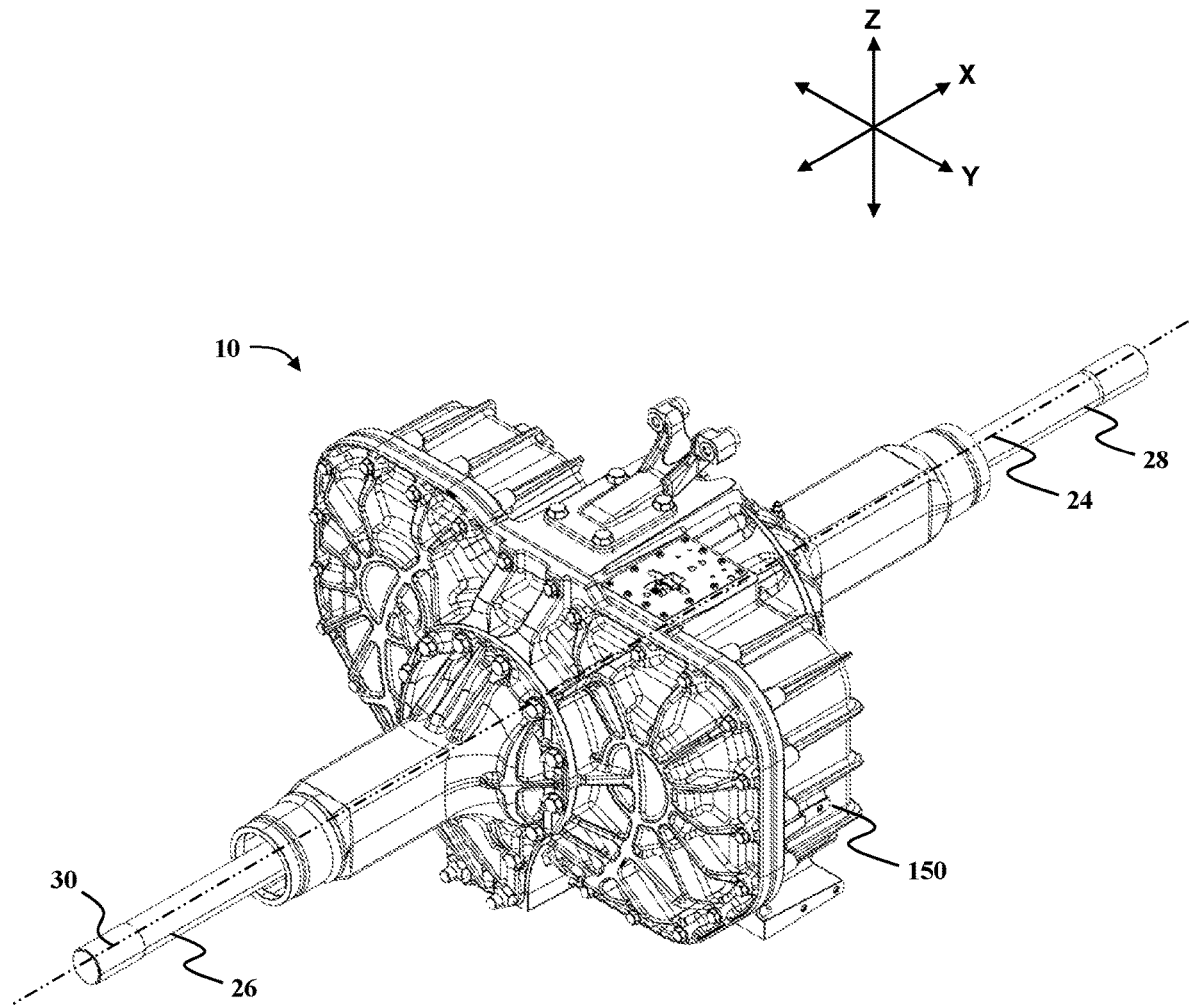
FIG. 1 is a perspective view of an axle assembly for use with a vehicle, according to an embodiment of the present invention.
Figure 2:
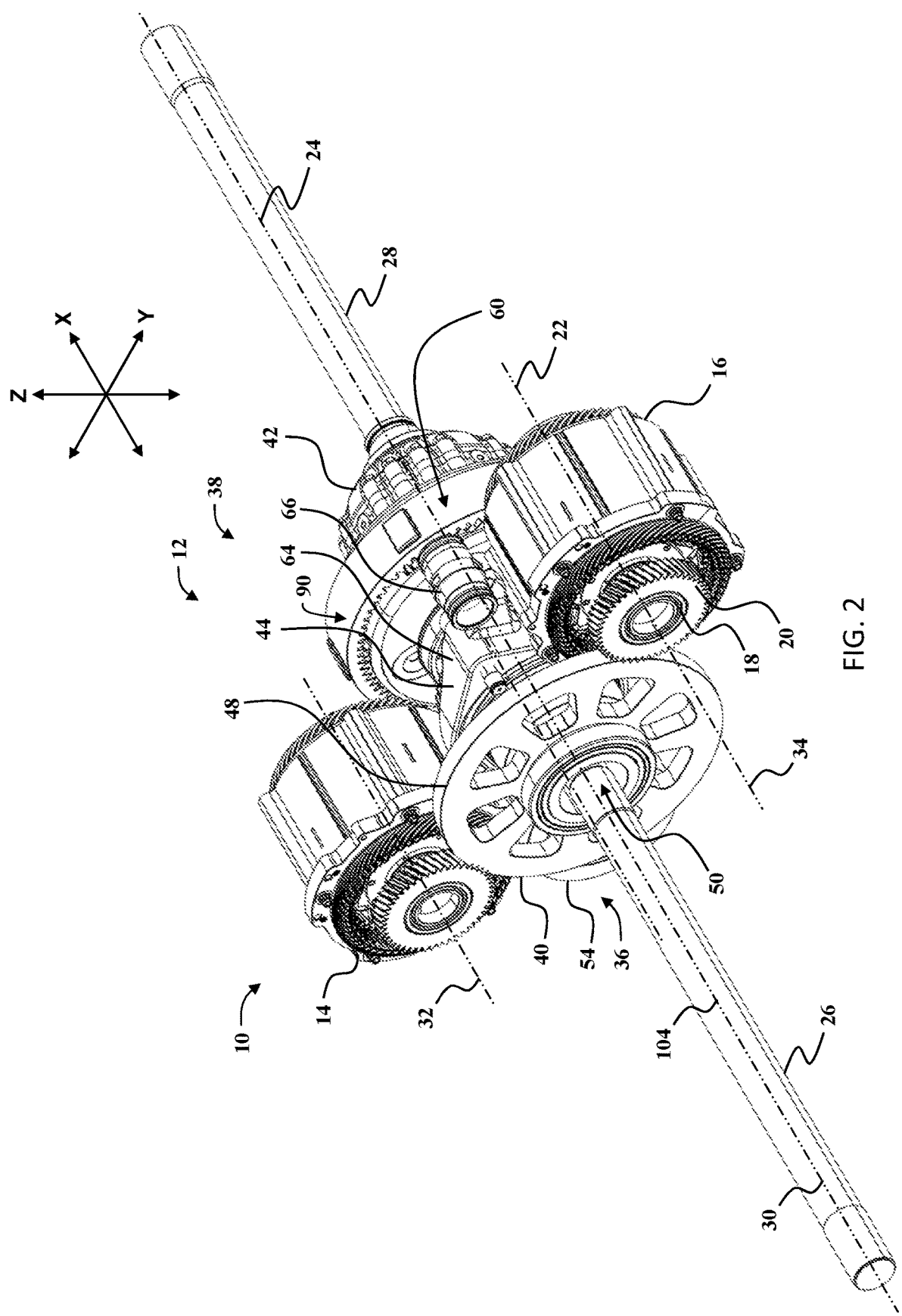
FIGS. 2-4 are perspective views of a reduction assembly that may be used with the axle assembly shown in FIG. 1, according to an embodiment of the present invention.
Figure 3:
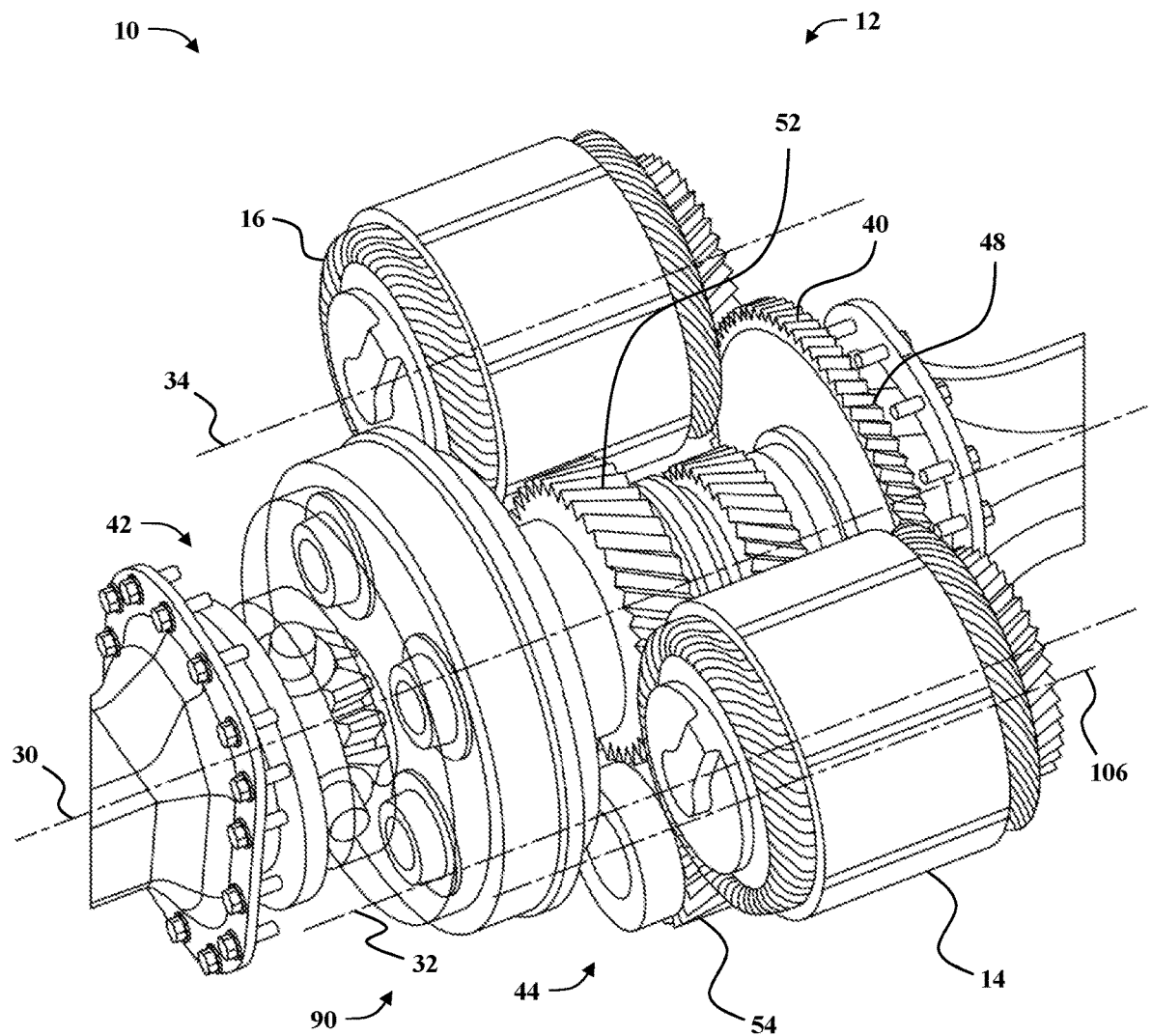
Figure 4:
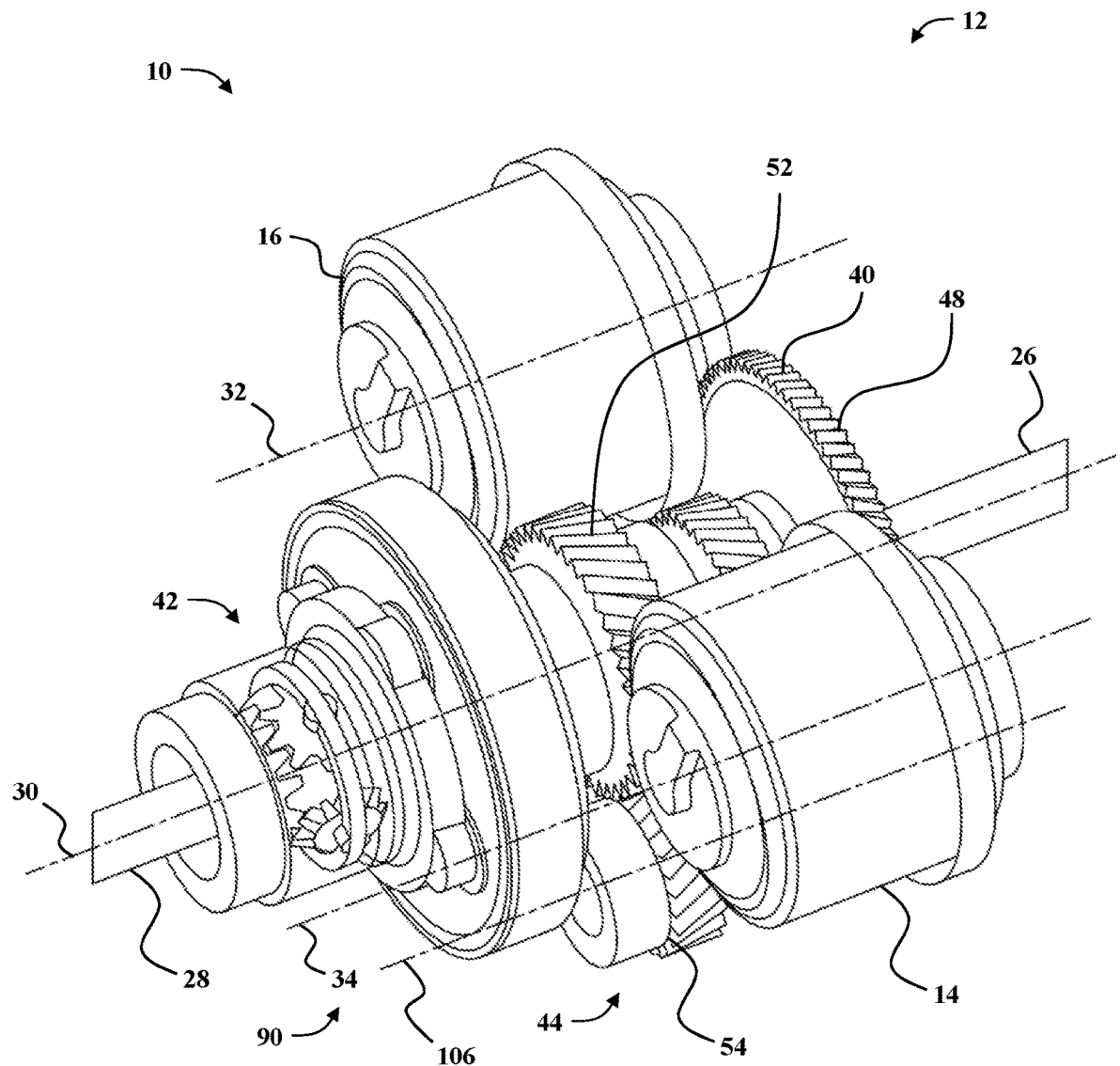
Figure 5:
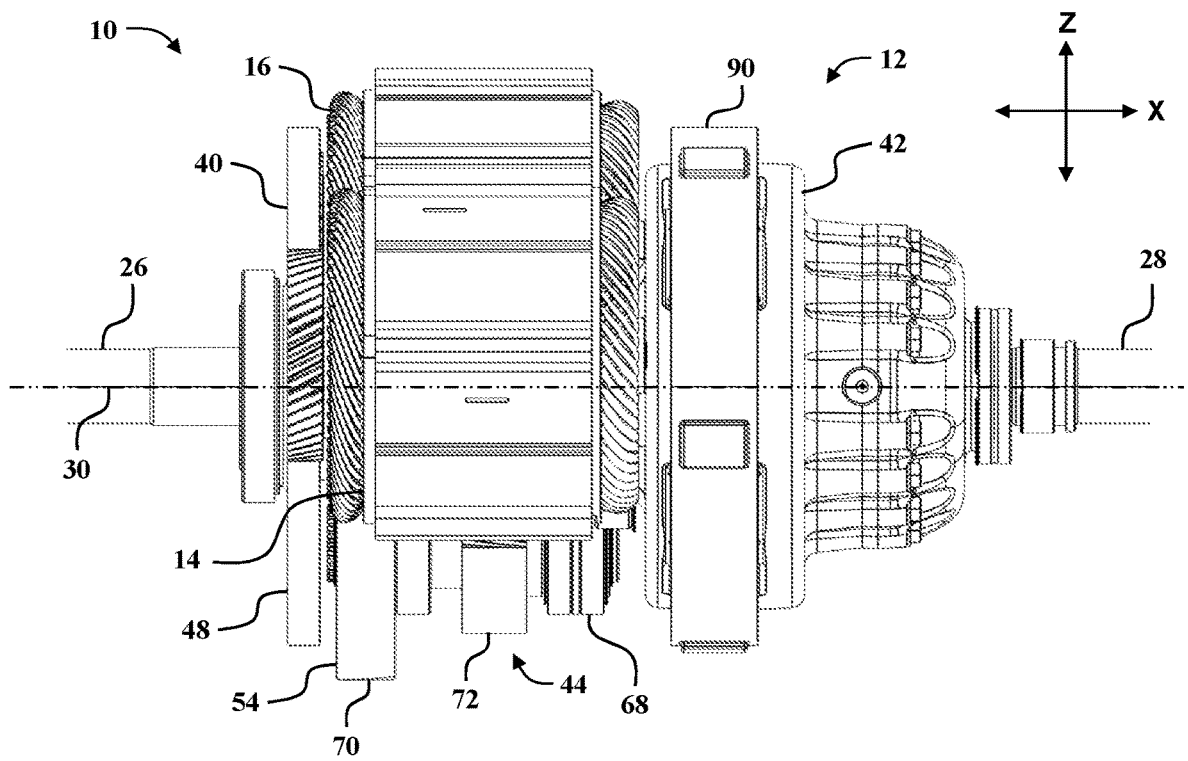
FIG. 5 is a right side elevation view of the reduction assembly shown in FIG. 2.

With reference to the Figures, wherein like numerals indicate like parts throughout the several views, the present invention includes an electric axle assembly for use with a vehicle such as, for example, a frame rail truck and/or a body-on-frame truck. The electric axle assembly propels the vehicle by transferring motive power to a ground surface. For example, in one embodiment, the axle assembly may be used with a vehicle including a frame rail assembly. The axle assembly may be coupled between a pair of wheel assemblies for transmitting power to opposing axle shafts. In the illustrated embodiment, the axle assembly includes two electric machines combined with a two speed transmission configuration to give both launch performance and velocity performance. In addition, the axle assembly includes a drive unit housing that integrates the electric motor and transmission compactly, supplies cooling for heat dissipation and transmits vehicle loads to suspension components. The axle architecture configuration of the electric axle assembly allows a two motor electric axle to package within the chassis rails of a standard truck with standard suspension. The double electric machine allows the system enough power for launch using smaller electric machines.

In the embodiment shown, the wheels of the vehicle are coupled to the electric axle assembly thereby supporting the vehicle for conveyance along the ground. For example, the vehicle wheels may be coupled to opposing ends of the electric axle assembly. The wheels may be arranged in a dual wheel configuration, wherein the wheels are coupled in pairs to each end of the electric axle assembly. Generally, dual wheels are used in applications requiring a greater payload capacity. However, it should be appreciated that a single wheel may be coupled to each end of the electric axle assembly. Furthermore, drive devices other than wheels may be coupled to the electric axle assembly. For example, crawler tracks or an inclined rail cog wheel may be used. The electric axle assembly may be mounted to the vehicle in a front drive configuration, or in a rear drive configuration. The electric axle assembly may also be mounted to a vehicle that was not originally equipped with an electric axle assembly. For example, the electric axle assembly can be retrofit to these vehicles to offer an electric driveline upgrade.

In general, the axle assembly may be used with a vehicle including a chassis upon which a body and other equipment is mounted. For example, a cab, a cargo box, a lift boom, or a hitch system may be mounted to the chassis. The chassis includes frame rails; suspension components such as springs, dampers, and trailing arms; and brake components such as air cylinders, brake calipers, brake rotors, brake drums, brake hoses, and the like. In one embodiment, at least some of the suspension components movably couple the electric axle assembly to the frame rails and allow the electric axle assembly to move relative to the frame rails as the vehicle is operated. The electric axle assembly is generally mounted perpendicular to the frame rails such that the vehicle travels in a direction aligned with the frame rails. For example, an axle centerline may be defined through the electric axle assembly and extends outwardly from sides of the vehicle.

The vehicle may be configured as an electric vehicle or a hybrid-electric vehicle. In one example of an electric vehicle, electricity to power the electric axle assembly may be stored in a battery mounted to the chassis. Alternatively, electricity may be provided from an external power source, such as an overhead wire or third rail system. If the vehicle is configured as a hybrid-electric vehicle, an internal combustion engine may be mounted to the chassis and coupled to a generator.

Referring to FIGS. 1-31, in the illustrated embodiment, the electric axle assembly 10 includes a reduction assembly 12 that is driven by a pair of electric machines 14, 16. In order to improve launch and velocity performance of the vehicle, the reduction assembly 12 is selectively shiftable between a first ratio and a second ratio. Each of the electric machines 14, 16 are coupled to the reduction assembly 12 to power to the wheels at either the first ratio or the second ratio. The electric machines 14, 16 may be DC or AC motors, brushed or brushless, and other types commonly known in the art. The electric machines 14, 16 may be motor generator machines capable of both outputting mechanical energy to propel the vehicle as well as generating electrical energy to charge a battery or slow the vehicle.

Each electric machine 14, 16 includes a rotor shaft 18 that protrudes from the electric machine 14, 16. A drive pinion 20 is fixed to the rotor shaft 18 and engagable with the reduction assembly 12. The rotor shaft 18 defines a rotor axis 22 that extends through the electric machine 14, 16. In the illustrated embodiment, the pair of electric machines 14, 16 includes a first electric machine 14 and a second electric machine 16 that are generally oriented transverse to the vehicle chassis (as shown in FIGS. 46-49). Each electric machine 14, 16 is oriented in the same direction and in parallel alignment such that each rotor axis 22 is parallel to the other and parallel to an axle centerline 24. The first and second electric machines 14, 16 are arranged with the second electric machine 16 positioned behind the first electric machine 14 along a longitudinal axis of the vehicle. In one embodiment, the electric machine 14, 16 includes direct oil cooling, which allows increased heat rejection over known water jacket cooling systems. The electric machine 14, 16 includes a direct oil cooling system that is configured to directly cool the motor windings. In one embodiment, the electric machine 14, 16 may include an IPM, 3-phase motor with 210 kW peak power, 198 kW for 15 min and 150 kW continuous power, 850 Nm peak torque, 593 Nm for 15 min and 509 Nm continuous torque, 7100 RPM, and 650 V (550 v to 750 v) Voltage, which higher power available at 750V.

In the illustrated embodiment, the axle assembly 10 includes a first axle shaft 26 and a second axle shaft 28 orientated along the axle centerline 24. The first axle shaft 26 is orientated along a first axis of rotation 30 and the second axle shaft 28 is orientated along the first axis of rotation 30. The first axle shaft 26 and the second axle shaft 28 extend along the first axis of rotation 30 in opposite directions. The first electric machine 14 is orientated along a second axis of rotation 32 that is substantially parallel with the first axis of rotation 30. The second electric machine 16 is spaced from the first electric machine 14 and orientated along a third axis of rotation 34 that is substantially parallel with the first axis of rotation 30.

Generally, the reduction assembly 12 has an input 36 and an output 38. The electric machines 14, 16 rotate the input 36 and the axle shafts 26, 28 are rotated by the output 38. The reduction assembly 12 includes a common gear reduction 40 that is driven by the first and the second electric machines 14, 16, a differential gear set 42 that is driven by the common gear reduction 40 to transfer rotational torque from the first and second electric machines 14, 16 to the first and second axle shafts 26, 28, and a speed change mechanism 44 that is coupled between the common gear reduction 40 and the differential gear set 42 to change the rotational torque transferred to the first and second axle shafts 26, 28. The input 36 includes the common gear reduction 40 that is engaged with each of the electric machines 14, 16, and the output 38 includes the differential gear set 42 that rotates the first and second axle shafts 26, 28 while allowing a relative difference of speed between each axle shaft. The differential gear set 42 may be locking, open, limited slip and the like.

The common gear reduction 40 includes an input shaft 46 and an input drive wheel 48 that is fixedly coupled to the input shaft 46. The input drive wheel 48 is engaged with the first and second electric machines 14, 16 for transferring the rotational torque from the first and second electric machines 14, 16 to the input shaft 46. For example, the input drive wheel 48 is coupled to the drive pinion 20 of each electric machine 14, 16 in a meshed arrangement and is driven by the electric machines 14, 16. The input shaft 46 is orientated coaxially with the first axis of rotation 30 and includes an inner surface 50 (shown in FIGS. 14A-14B) that defines an input shaft bore 51 that is sized and shaped to receive the first axle shaft 26 therethrough. The input drive wheel 48 is coupled to the input shaft 46 to transfer torque from the electric machines 14, 16 to the input shaft 46. The input shaft 46 defines the bore 51 along the first axis of rotation 30 through which the first axle shaft 26 extends, and includes two ends rotatably supported by bearings.

In the illustrated embodiment, the speed change mechanism 44 includes a reduction gear set 52 that is driven by the common gear reduction 40 and an output gear set 54 that is driven by the reduction gear set 52. The reduction gear set 52 includes a first reduction gear 56, a second reduction gear 58, and a shift mechanism 60. The first reduction gear 56 is coupled to the output gear set 54, and the second reduction gear 58 is coupled to the output gear set 54. The shift mechanism 60 is positioned between the first reduction gear 56 and the second reduction gear 58 and configured to selectively engage the first reduction gear 56 and the second reduction gear 58. The two reduction gears 56, 58 are each rotatably supported on the input shaft 46. The first reduction gear 56 corresponds to the first ratio of the reduction assembly 12, and the second reduction gear 58 corresponds to the second ratio of the reduction assembly 12. In one embodiment shown in FIG. 16, the first reduction gear 56 has a smaller diameter than the second reduction gear 58. In other embodiments shown in FIGS. 22 and 28, the first reduction gear 56 has a larger diameter than the second reduction gear 58. In addition, in other embodiments, the first reduction gear 56 and the second reduction gear 58 may each have substantially the same diameter. In the illustrated embodiment, each of the reduction gears 56, 58 can spin freely on the input shaft 46 such that when the corresponding ratio is not engaged, no torque is transferred between the input shaft 46 and the reduction gears 56, 58. In one embodiment, each reduction gear 56, 58 includes a splined portion engageable with the shift mechanism 60 to rotatably couple the reduction gears 56, 58 to the input shaft 46.

In the illustrated embodiment, the shift mechanism 60 includes a shift sleeve 62 (shown in FIG. 11), a shift fork 64 (shown in FIG. 2), and an actuator 66. The shift sleeve 62 is rotatably coupled to the input shaft 46 such that the shift sleeve 62 and the input shaft 46 rotate at the same speed. The shift fork 64 is operably coupled to the actuator 66 and to the shift sleeve 62 such that movement of the actuator 66 causes the shift fork 64 to slide the shift sleeve 62 along the input shaft 46. The shift sleeve 62 is selectively engageable with the first reduction gear 56 and the second reduction gear 58 to place the reduction assembly 12 in either the first ratio or the second ratio, respectively. The shift sleeve 62 and the reduction gears 56, 58 include mating engagement features that, when engaged, rotatably couple the reduction gears 56, 58 to the input shaft 46. The engagement features may include splines, a dog clutch, or a synchronizer to aid shifting.

Additionally, the shift fork 64 and shift sleeve 62 may be movable into a neutral position where neither of the reduction gears 56, 58 are engaged with the shift sleeve 62. The actuator 66 may be controlled manually or automatically. The actuator 66 may be responsive to hydraulic pressure, pneumatic pressure, or electronic signals generated by a control module. Alternatively, the actuator 66 may include a mechanical linkage controlled by an operator.

The output gear set 54 includes an output counter shaft 68 and a pair of output gears 70, 72 that are fixedly coupled to the output counter shaft 68. Each output gear 70, 72 is coupled to a corresponding reduction gear 56, 58. The counter shaft 68 has two ends rotatably supported by bearings. The pair of output gears includes a first output gear 70 that is engaged with the first reduction gear 56, and a second output gear 72 that is engaged with the second reduction gear 58. The first output gear 70 and the second output gear 72 are supported on and rotatably fixed to the counter shaft 68 such that the first and second output gears 70, 72 and the counter shaft 68 rotate at the same speed. In one embodiment shown in FIG. 16, the first output gear 70 has a larger diameter than the second output gear 72. In other embodiments shown in FIGS. 22 and 26, the first output gear 70 has a smaller diameter than the second output gear 72. In addition, in other embodiments, the first output gear 70 and the second output gear 72 may each have substantially the same diameter.

Figure 24:
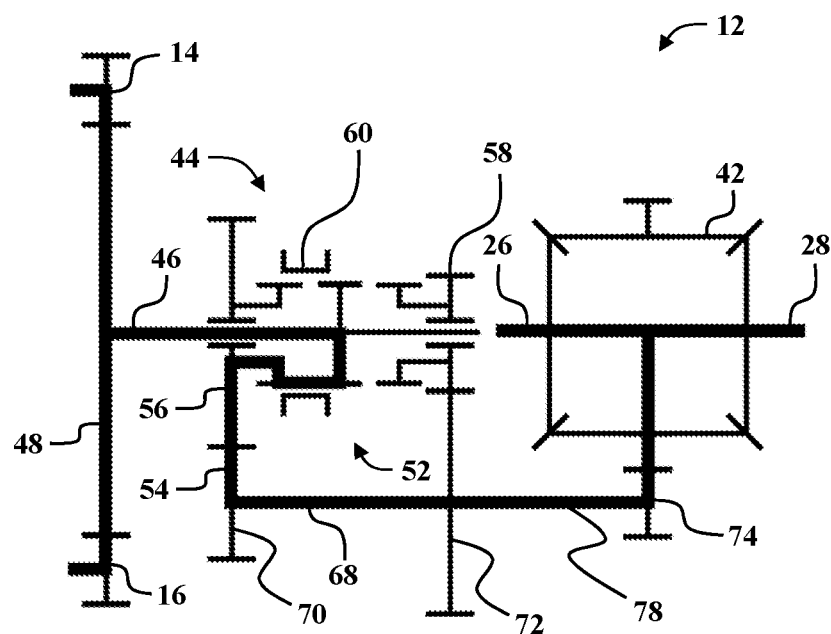
FIG. 24 is a schematic diagram of the reduction assembly shown in FIG. 22 illustrating power flow of a first ratio.
Figure 25:
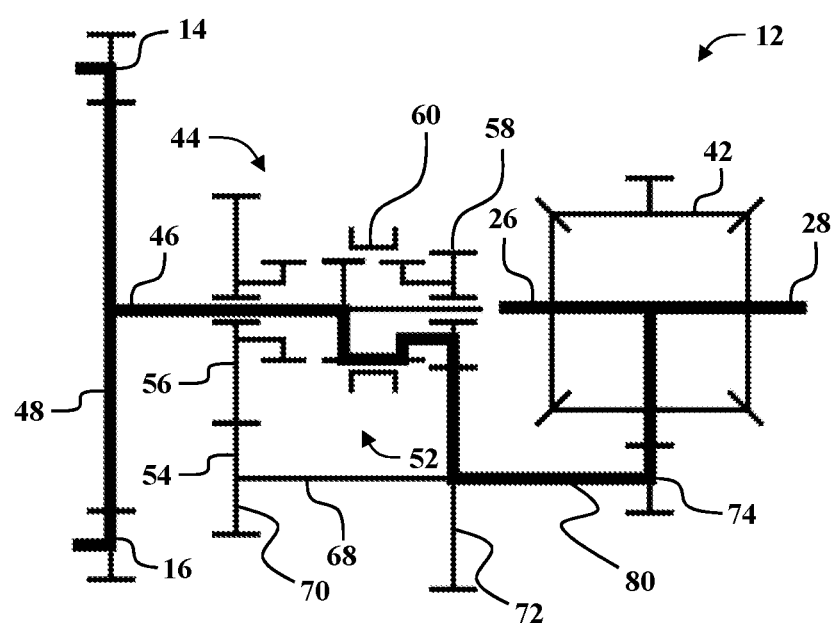
FIG. 25 is a schematic diagram of the reduction assembly shown in FIG. 22 illustrating power flow of a second ratio.
Figure 26:
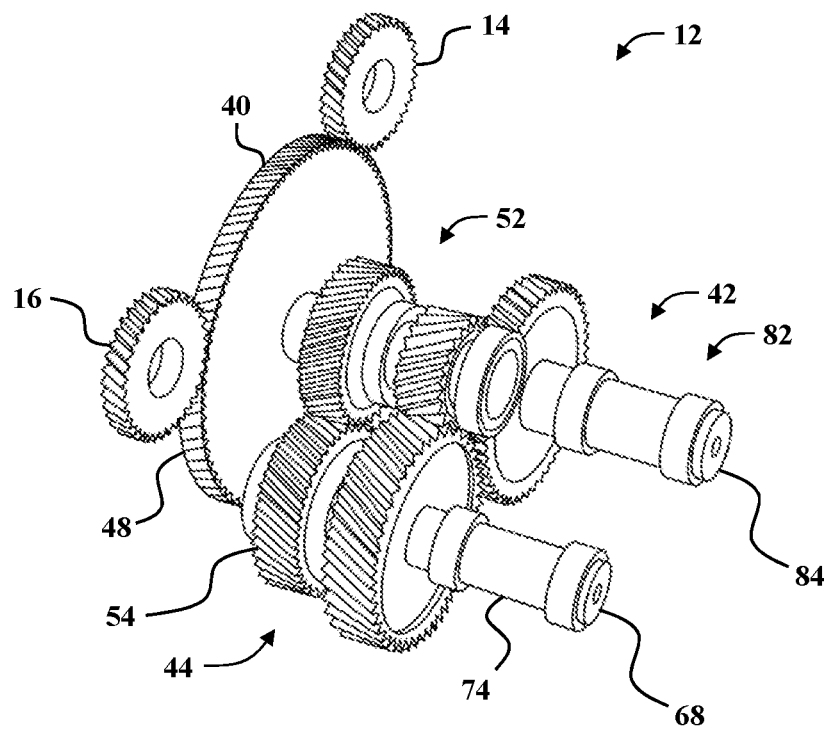
FIG. 26 is perspective views of a reduction assembly that may be used with the axle assembly shown in FIG. 1, according to an embodiment of the present invention.
Figure 27:
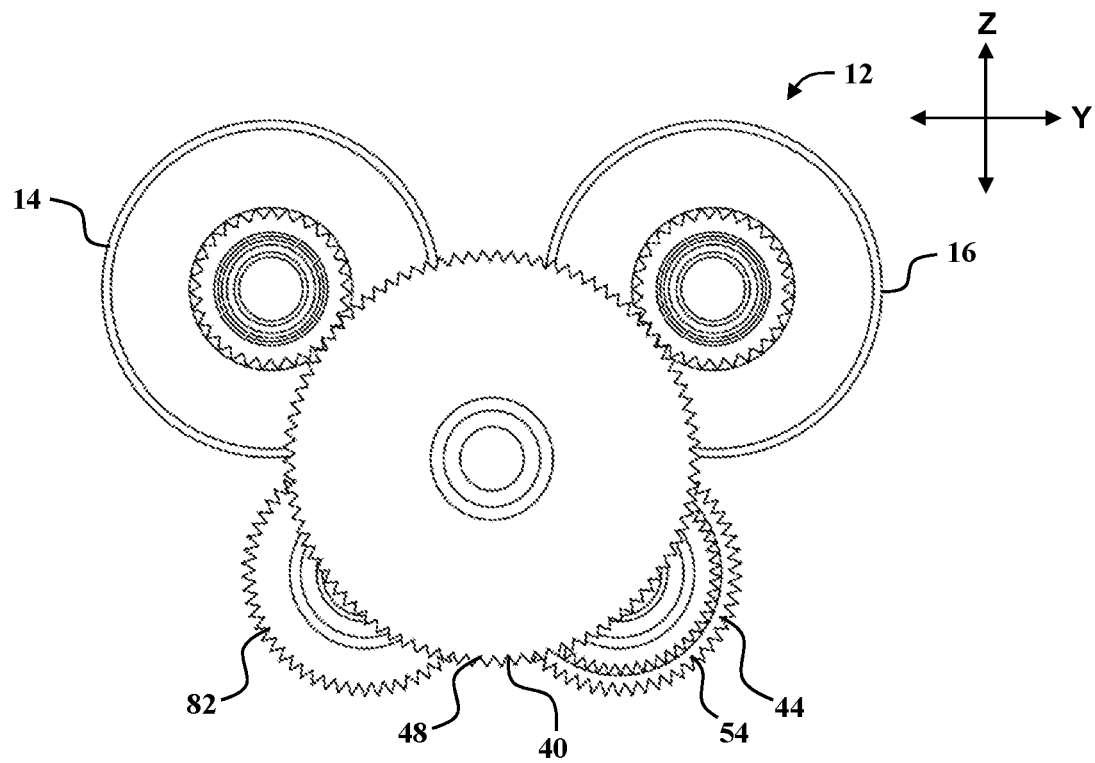
FIG. 27 is a front elevation view of the reduction assembly shown in FIG. 26.
Figure 28:
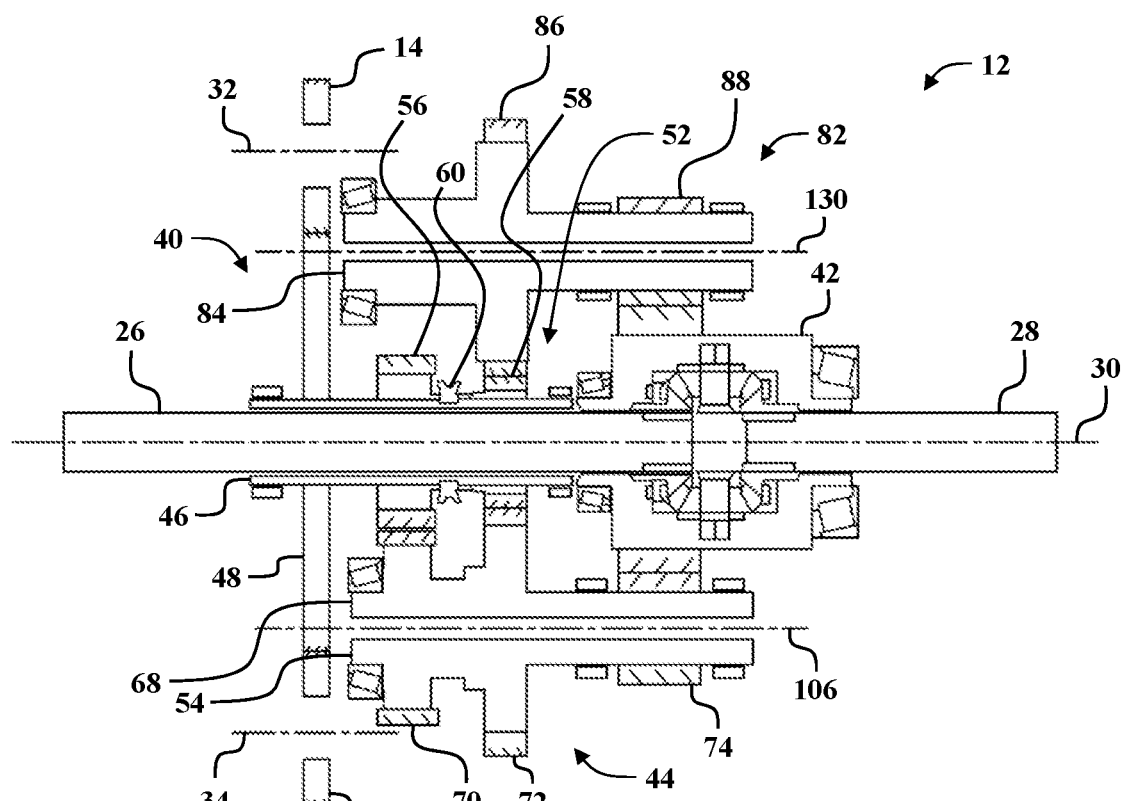
FIG. 28 is a sectional view of the reduction assembly shown in FIG. 26, according to an embodiment of the present invention.
Figure 29:
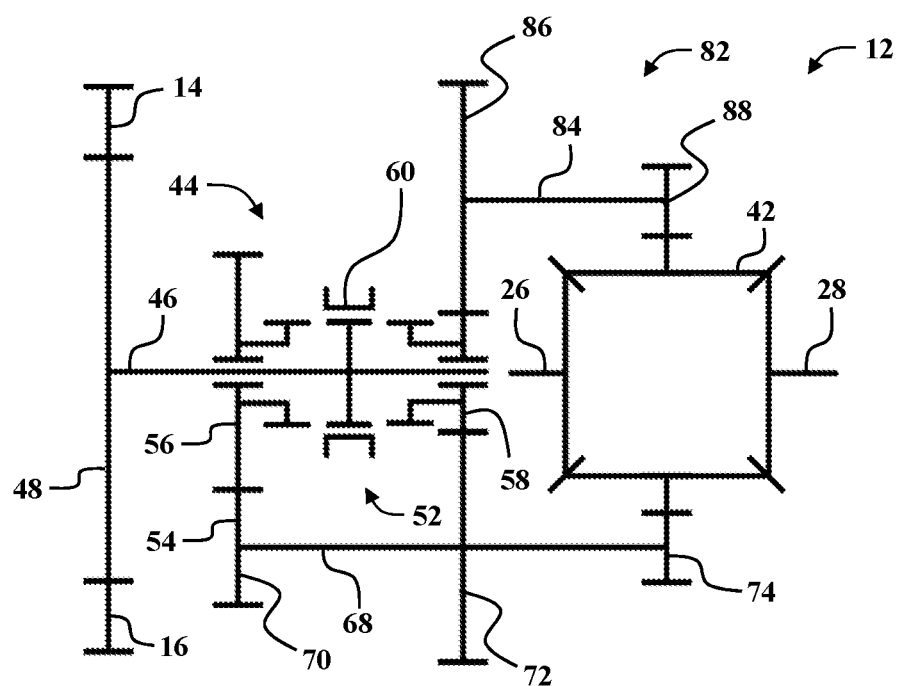
FIG. 29 is a schematic diagram of the reduction assembly shown in FIG. 26, according to an embodiment of the present invention.

Referring to FIGS. 20-25, in one embodiment, the output gear set 54 includes an output pinion 74 that is coupled to an end of the counter shaft 68. The output pinion 74 is coupled to the differential gear set 42 and is engaged with a ring gear 76 of the differential gear set 42 for transferring rotational torque from the output shaft 68 to the differential gear set 42 and axle shafts 26, 28. FIGS. 24-25 illustrate the power flow through the reduction assembly 12. FIG. 24 illustrates the power flow with the reduction assembly 12 in the first ratio, represented by line 78. FIG. 25 illustrates the power flow with the reduction assembly 12 in the second ratio, represented by line 80. As will be discussed below, the axle assembly 10 includes the shift mechanism 60 to selectively engage either the first ratio or the second ratio.

Referring to FIG. 24, with the reduction assembly 12 in the first ratio 78, torque that is generated by one or both of the electric machines 14, 16, is transferred to the input shaft 46 via the drive pinions 20 and the input drive wheel 48. The input shaft 46 rotates the shift sleeve 62, which is engaged with the first reduction gear 56. The first reduction gear 56 is engaged with the first output gear 70 to transfer torque to the output counter shaft 68. The output counter shaft 68 rotates the output pinion 74 at the same rate as the first output gear 70. Rotation of the counter shaft 68 rotates the output pinion 74, thereby rotating the differential gear set 42 and axle shafts 26, 28.

Referring to FIG. 25, with the reduction assembly 12 in the second ratio 80, torque that is generated in one or both of the electric machines 14, 16 is transferred to the input shaft 46 via the drive pinions 20 and the input drive wheel 48. The input shaft 46 rotates the shift sleeve 62, which is engaged with the second reduction gear 58. The second reduction gear 58 is engaged with the second output gear 72 to transfer torque to the output counter shaft 68. The output counter shaft 68 rotates the output pinion 74, thereby rotating the differential gear set 42 and axle shafts 26, 28.

Figure 30:
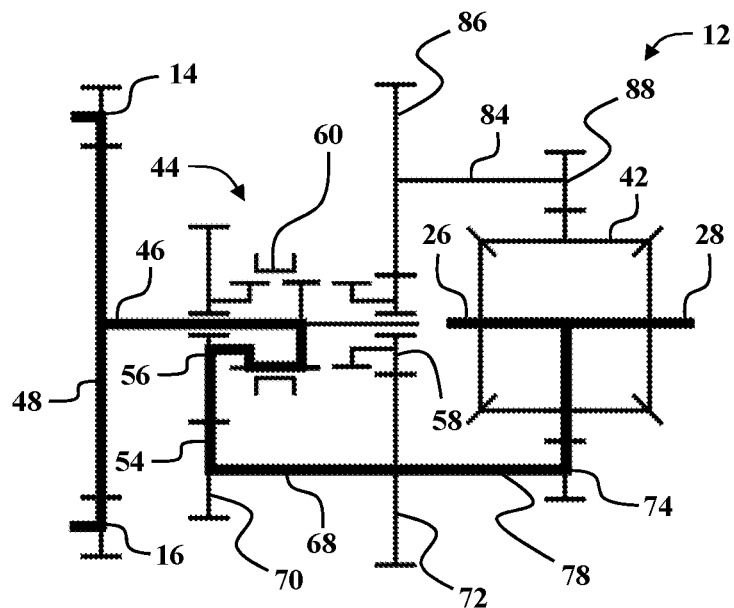
FIG. 30 is a schematic diagram of the reduction assembly shown in FIG. 26 illustrating power flow of a first ratio.
Figure 31:
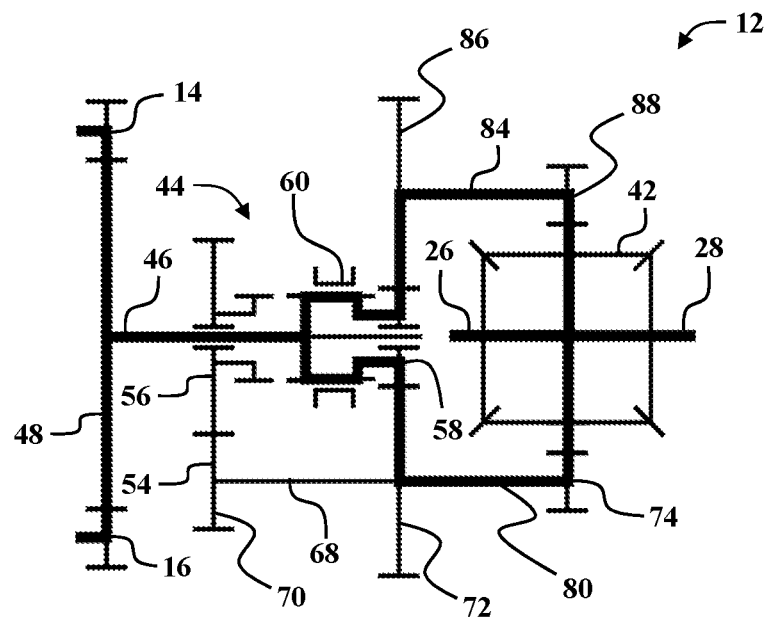
FIG. 31 is a schematic diagram of the reduction assembly shown in FIG. 26 illustrating power flow of a second ratio.
Figure 32:
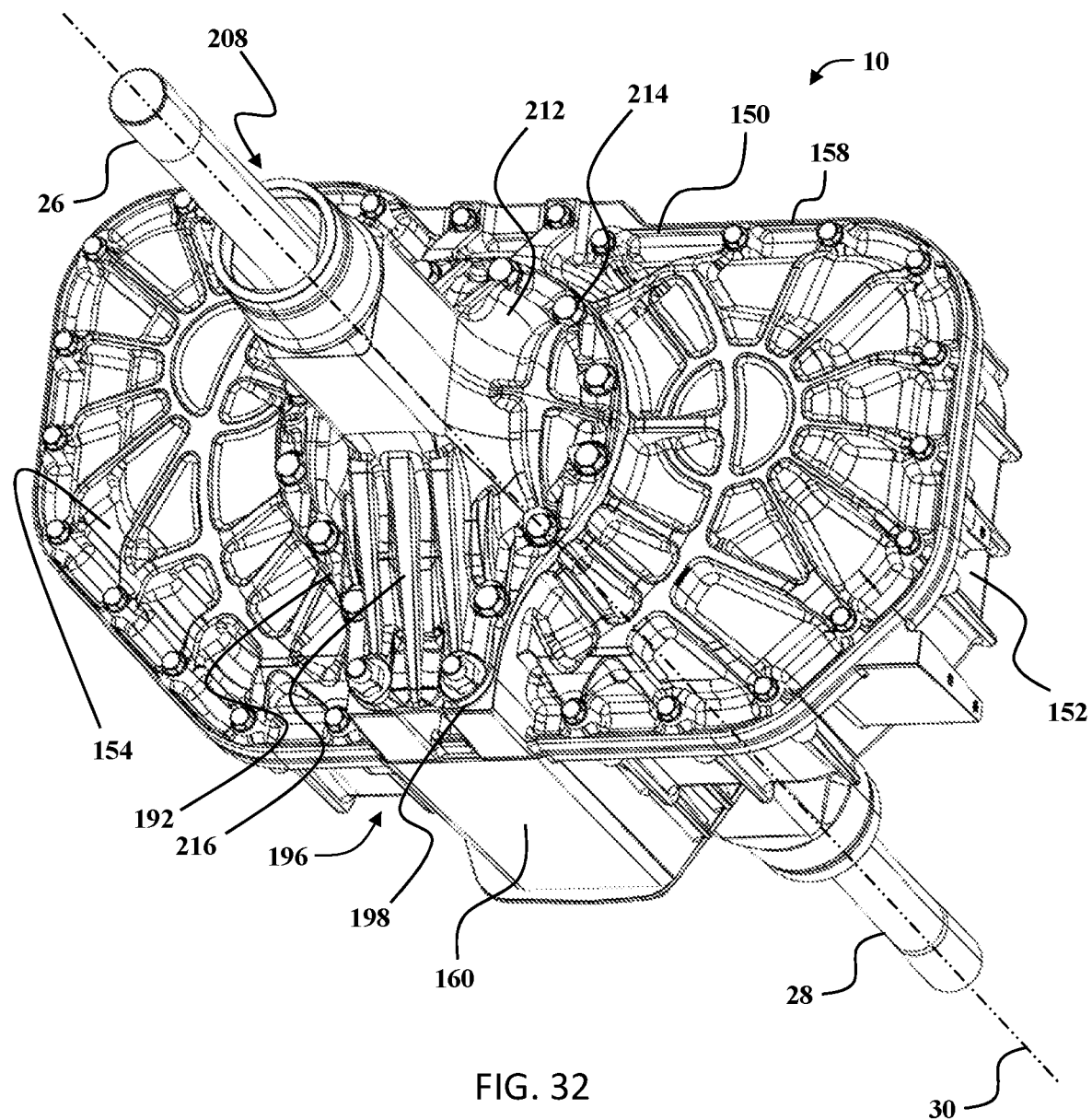
FIG. 32 is a perspective view of a drive unit housing that may be used with the axle assembly shown in FIG. 1, according to an embodiment of the present invention.
Figure 33:
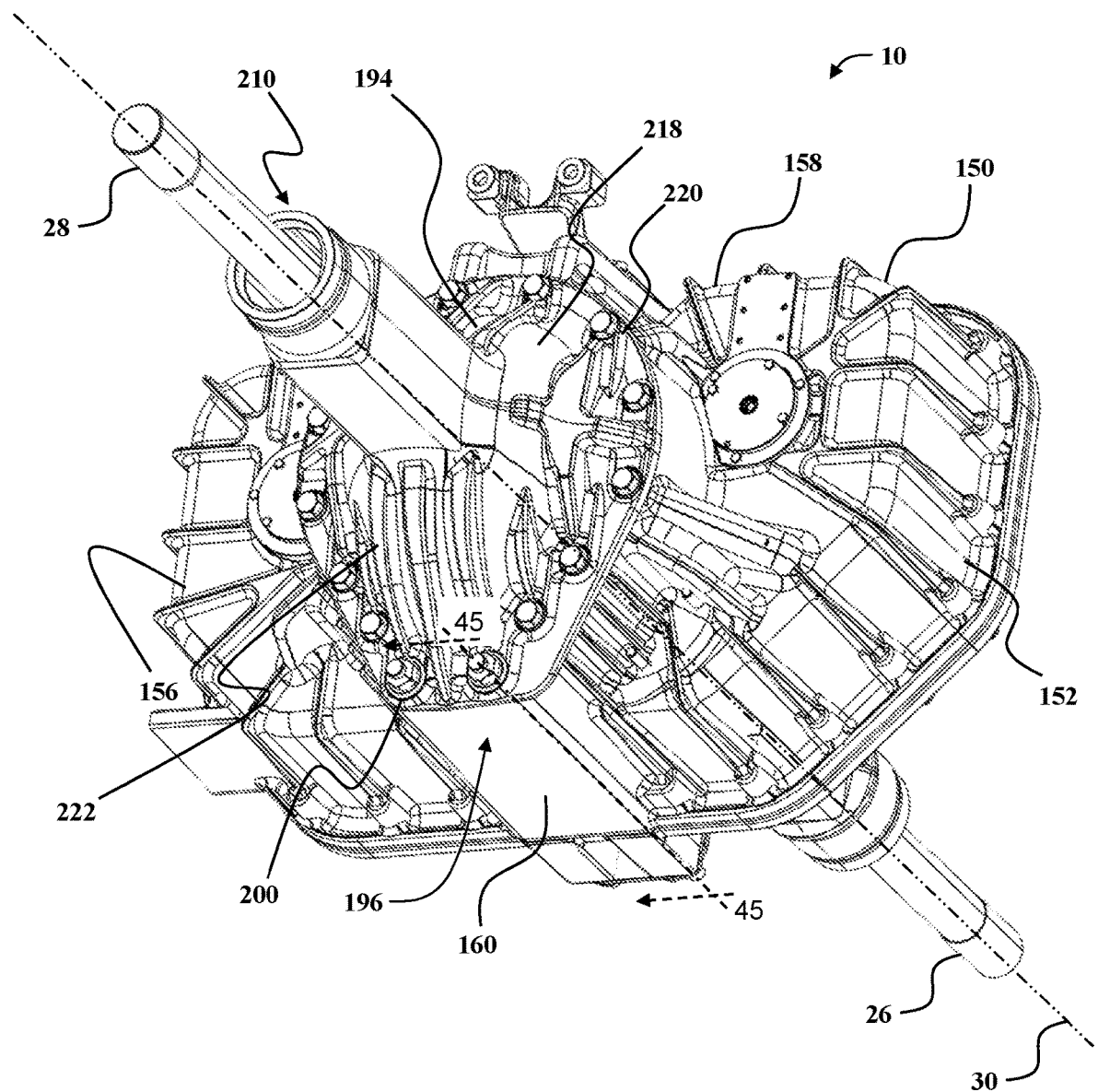
FIG. 33 is another perspective view of the drive unit housing shown in FIG. 32.
Figure 34:
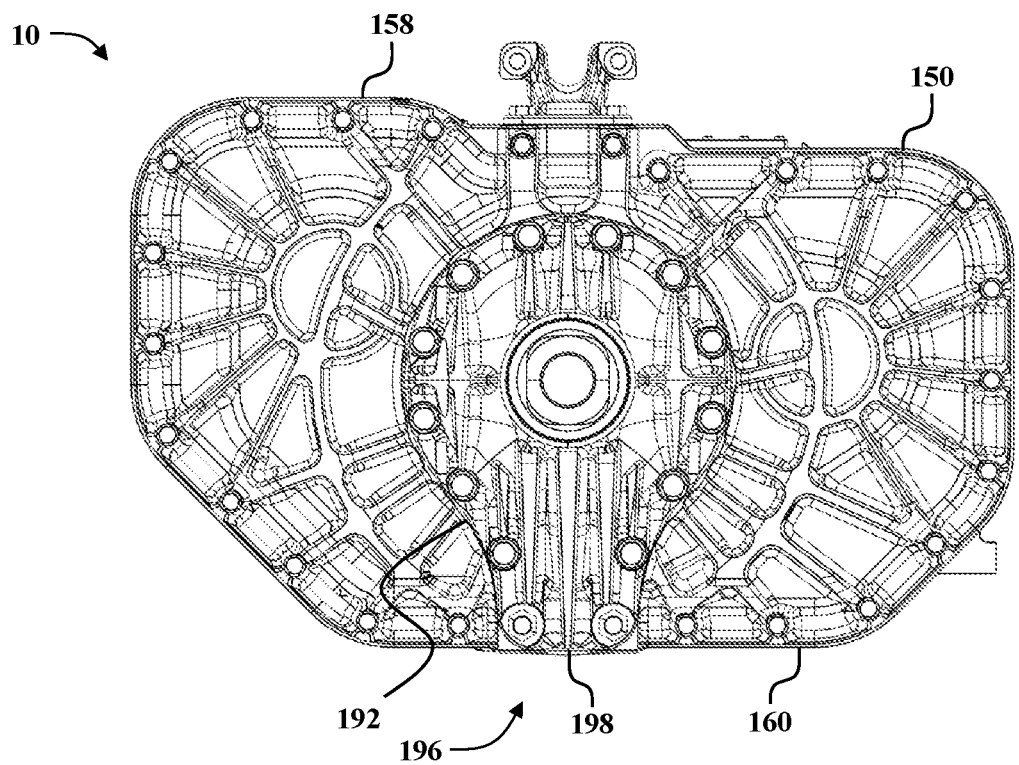
FIG. 34 is a front elevation view of the drive unit housing shown in FIG. 32.
Figure 35:
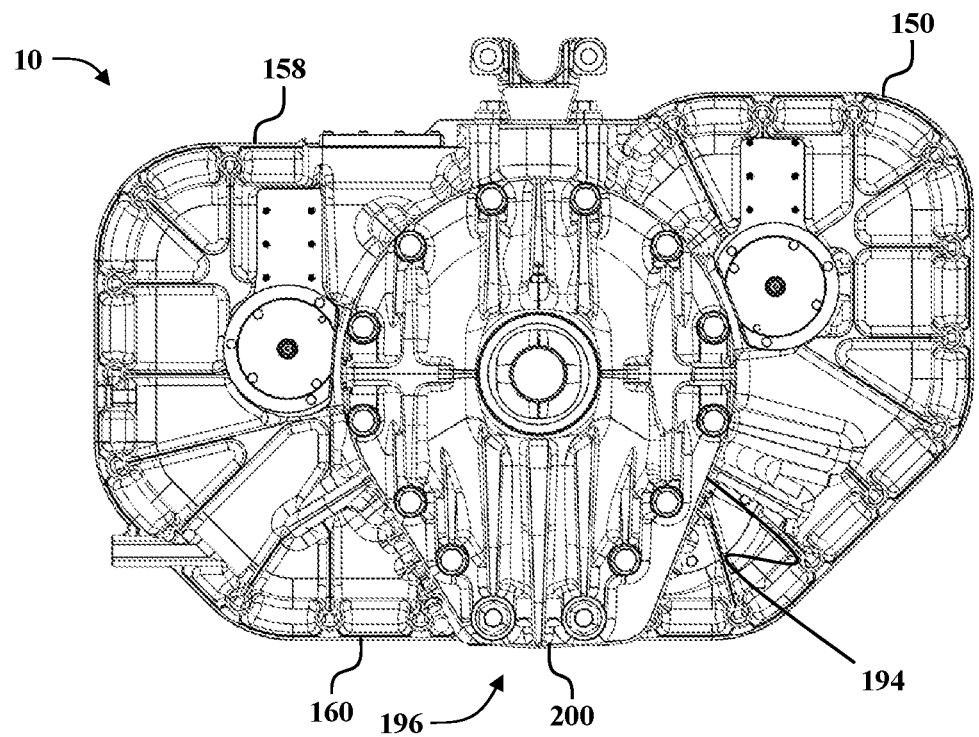
FIG. 35 is a rear elevation view of the drive unit housing shown in FIG. 32.
Figure 36:
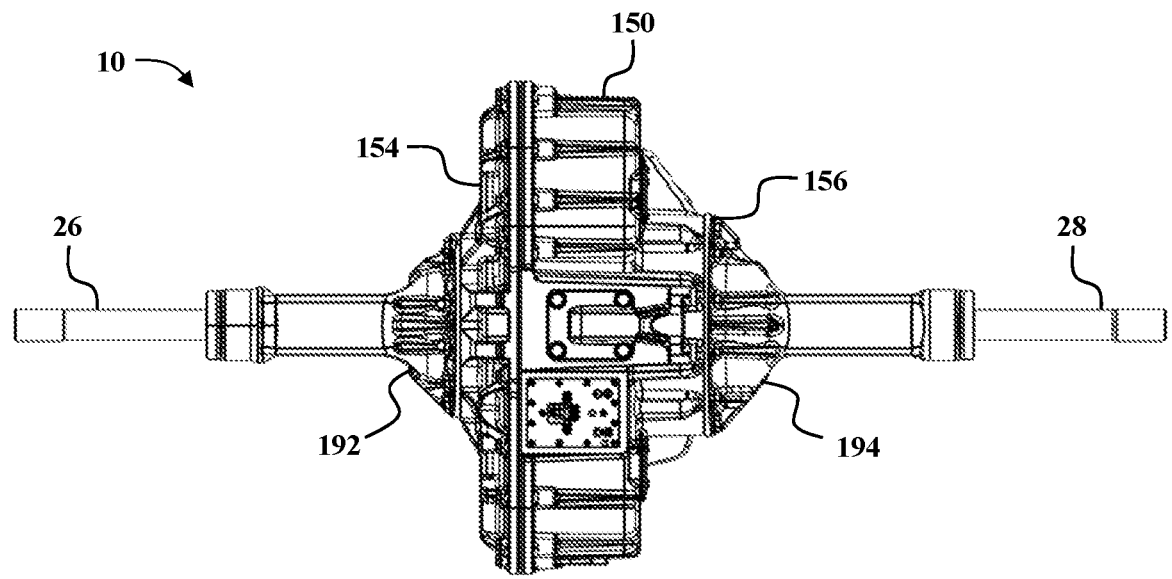
FIG. 36 is a top elevation view of the drive unit housing shown in FIG. 32.
Figure 37:
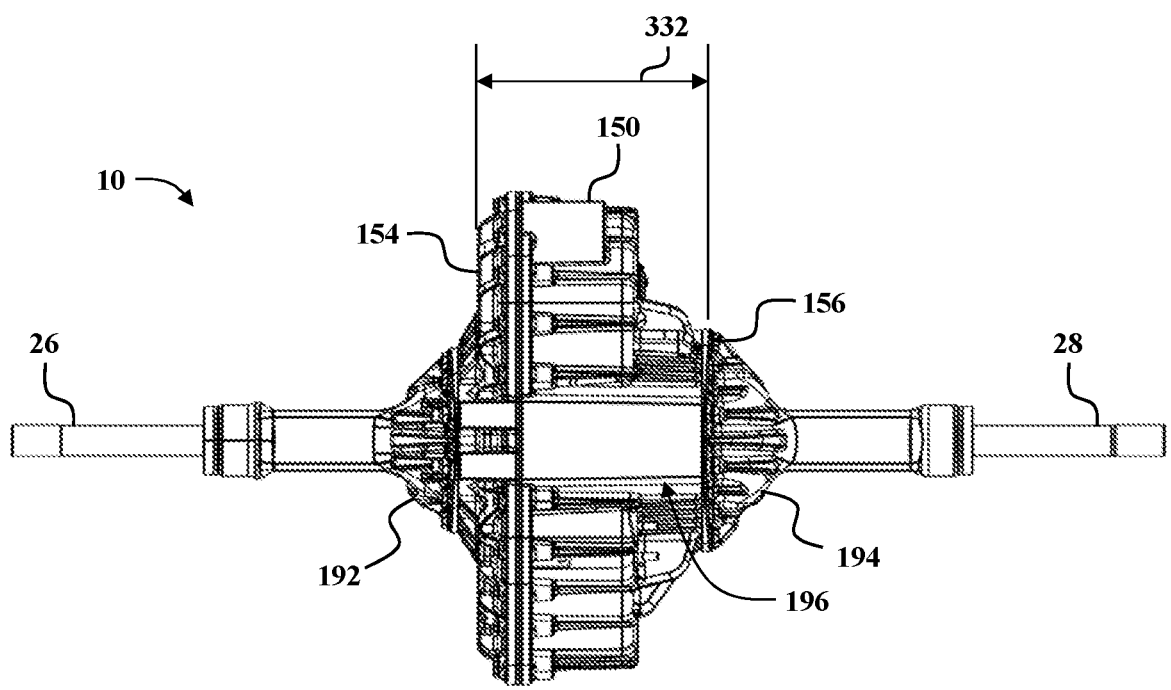
FIG. 37 is a bottom elevation view of the drive unit housing shown in FIG. 32.
Figure 38:
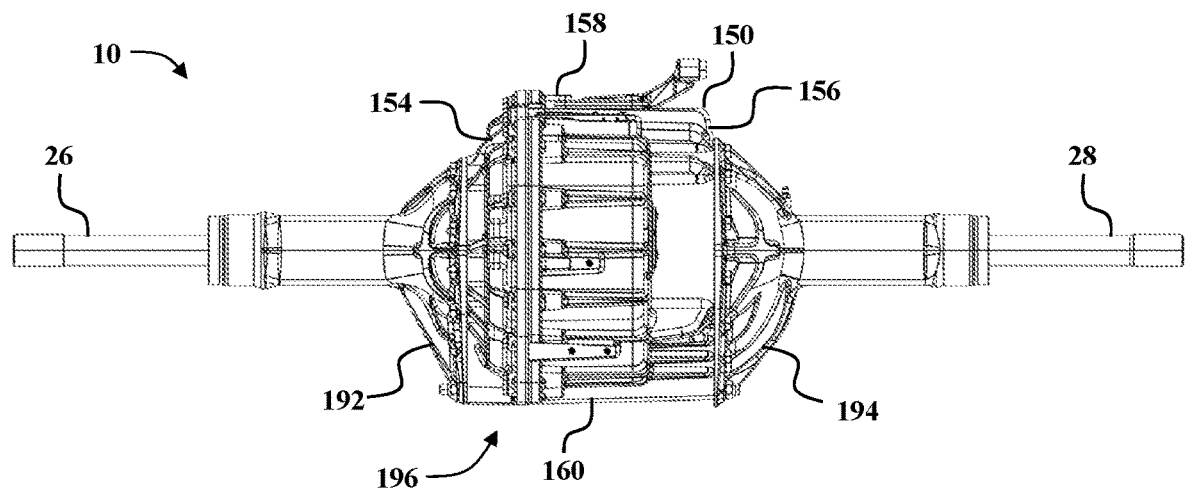
FIG. 38 is a right side elevation view of the drive unit housing shown in FIG. 32.
Figure 39:
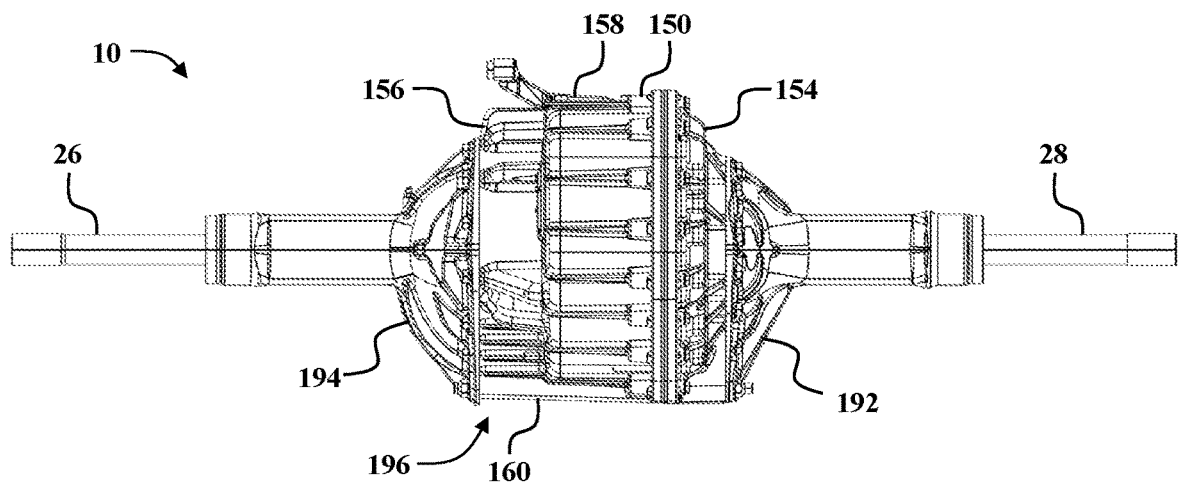
FIG. 39 is a left side elevation view of the drive unit housing shown in FIG. 32.
Figure 40:
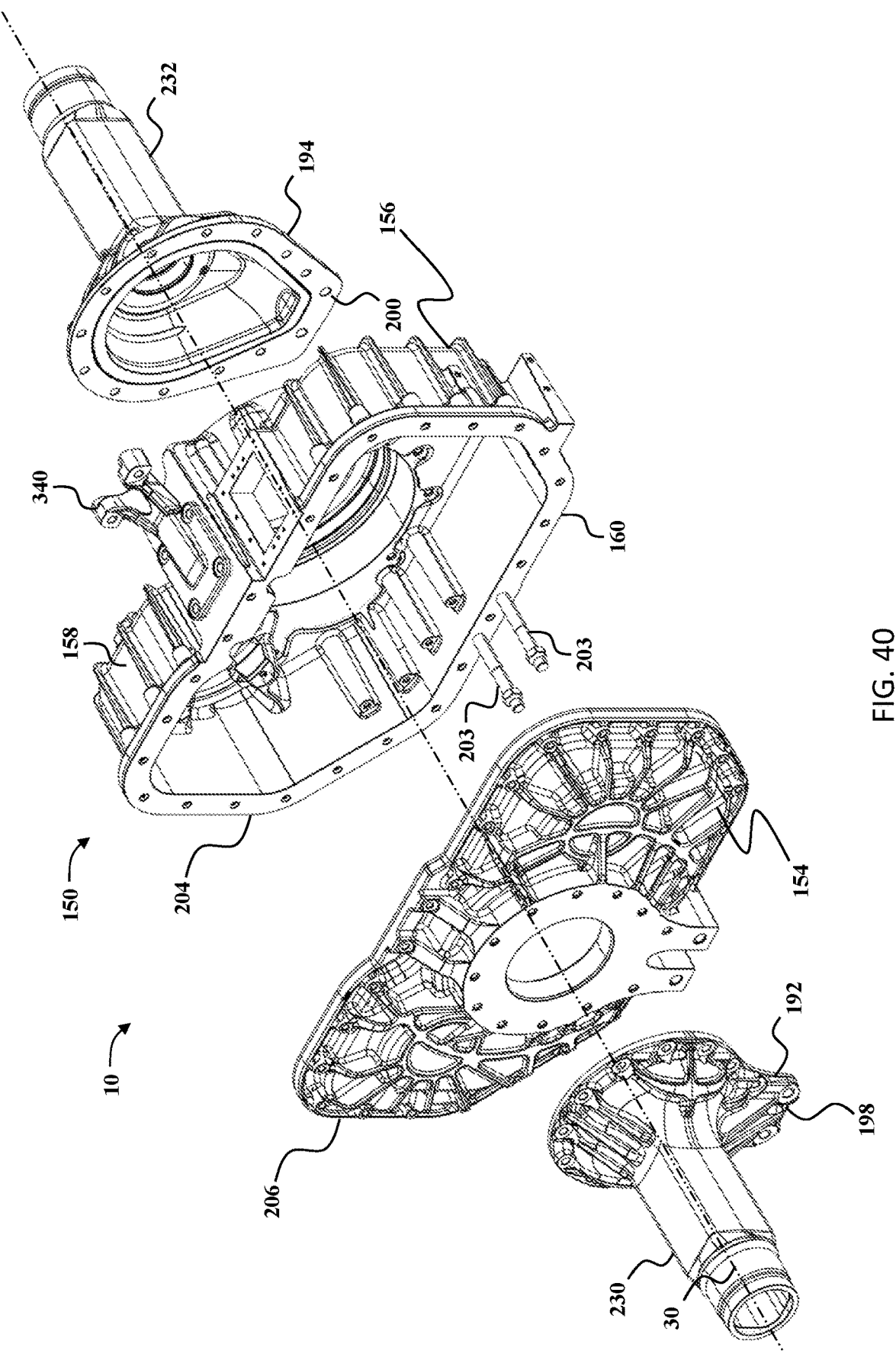
FIG. 40 is an exploded perspective view of the drive unit housing shown in FIG. 32.

In one embodiment, as shown in FIGS. 26-31, the reduction assembly 12 may include a second output gear set 82 that is driven by the reduction gear set 52. The second output gear set 82 includes a second output counter shaft 84 and a third output gear 86. The third output gear 86 is supported on and rotatably fixed to the second output counter shaft 84 such that the third output gear 86 and the second output counter shaft 84 rotate at the same speed. The third output gear 86 is engaged with the second reduction gear 58. A second output pinion 88 is coupled to an end of the second output counter shaft 84. The second output pinion 88 is coupled to the differential gear set 42 and engages with the ring gear 76 of the differential gear set 42 for transferring rotational torque from the second output counter shaft 84 to the differential gear set 42 and axle shafts 26, 28. The output pinions 74, 88 each engaged with the ring gear 76 to transfer rotation from the output counter shafts 68, 84, to the differential gear set 42 and axle shafts 26, 28. FIGS. 30-31 illustrate the power flow through the reduction assembly 12 in the first ratio 78 and the second ratio 80.

Referring to FIG. 30, with the reduction assembly 12 in the first ratio 78, torque generated in one or both of the electric machines 14, 16 is transferred to the input shaft 46 via the drive pinions 20 and the input drive wheel 48. The input shaft 46 rotates the shift sleeve 62, which is engaged with the first reduction gear 56. The first reduction gear 56 is engaged with the first output gear 70 to transfer torque to the first counter shaft 68. The first counter shaft 68 rotates the first output pinion 74 at the same rate as the first output gear 70. The first counter shaft 68 also rotates the second output gear 72 at the same speed as the first output gear 70. Some of the torque from the first counter shaft 68 is transferred to the second counter shaft 84 due to engagement of the second reduction gear 58 with both the second output gear 72 and the third output gear 86. Each of the counter shafts 68, 84 rotates the respective output pinion 74, 88, thereby rotating the differential gear set 42 and axle shafts 26, 28.

Referring to FIG. 31, with the reduction assembly 12 in the second ratio 80, torque generated in one or both of the electric machines 14, 16 is transferred to the input shaft 46 via the drive pinions 20 and the input drive wheel 48. The input shaft 46 rotates the shift sleeve 62, which is engaged with the second reduction gear 58. The second reduction gear 58 is engaged with the second output gear 72 to transfer torque to the first counter shaft 68, and with the third output gear 86 to transfer torque to the second counter shaft 84. Each of the counter shafts 68, 84 rotates the respective output pinion 74, 88 and thereby the differential gear set 42 and axle shafts 26, 28.

Figure 13:
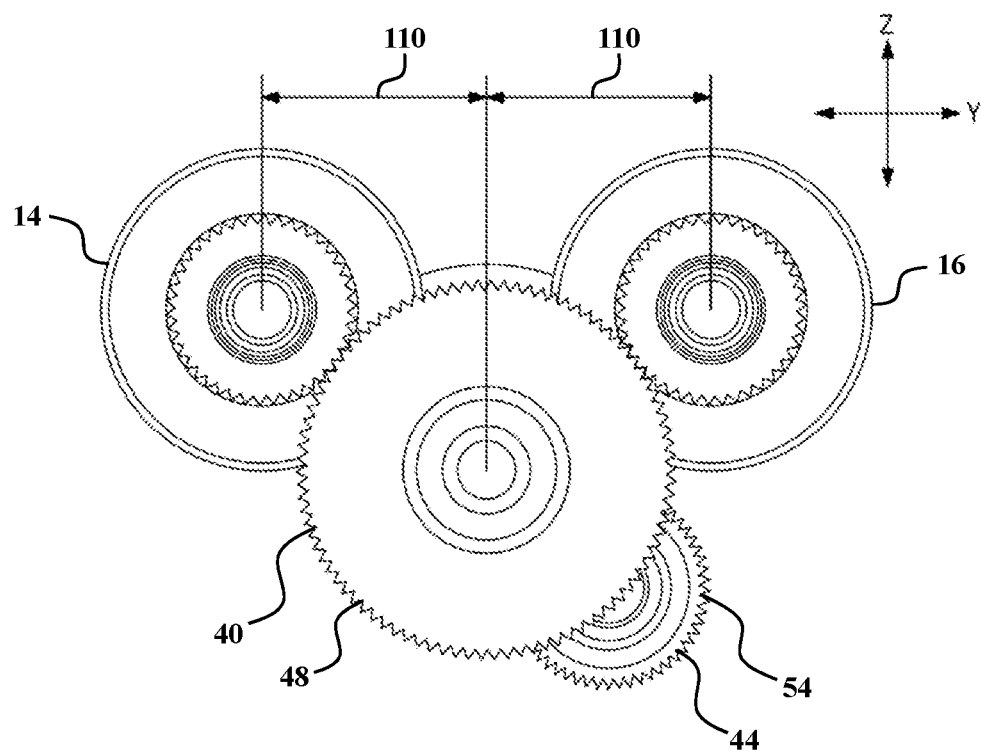
FIG. 13 is a front elevation view of the reduction assembly shown in FIG. 12.
Figure 14A:
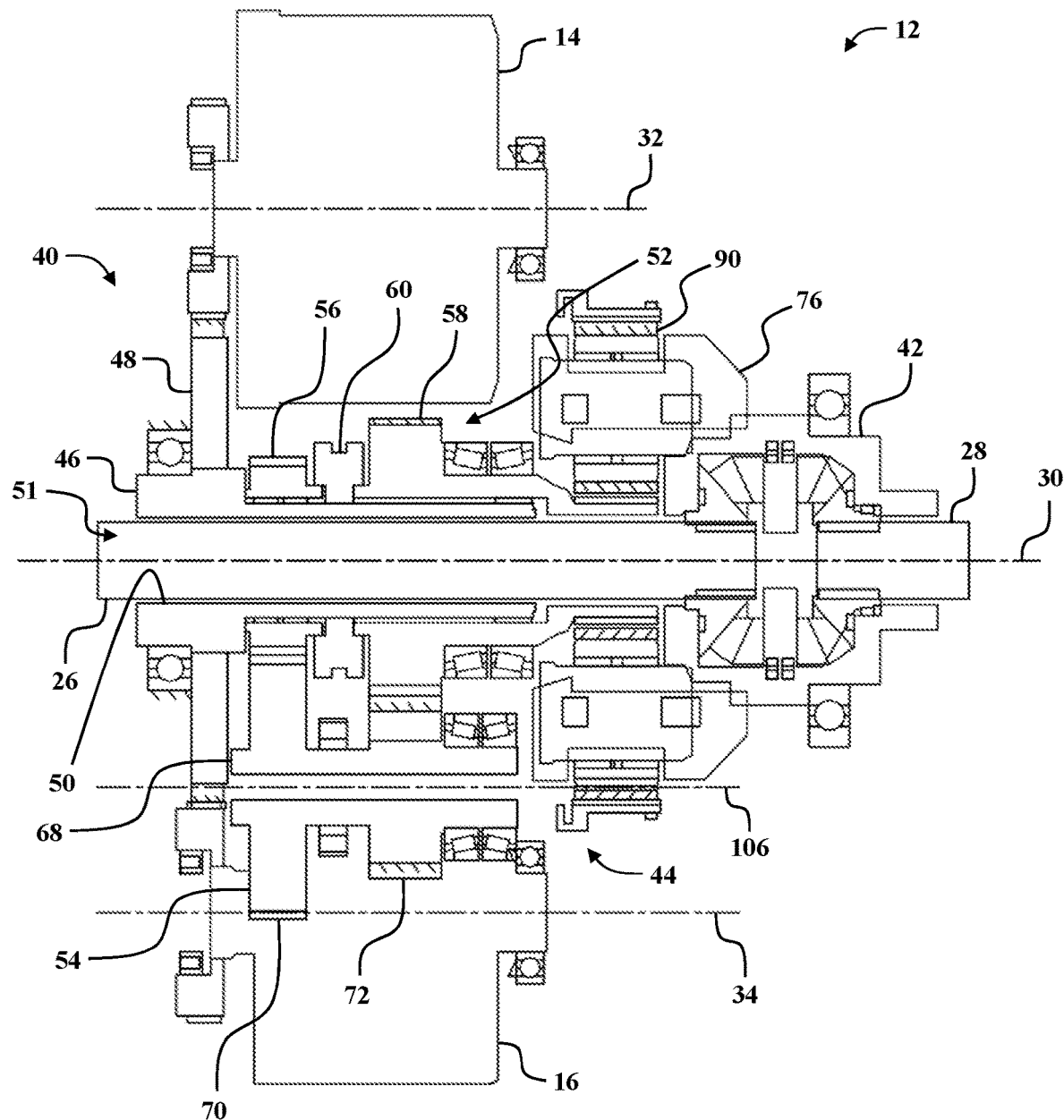
FIGS. 14A-16 are sectional views of the reduction assembly shown in FIGS. 2 and 12, according to embodiments of the present invention.
Figure 14B:
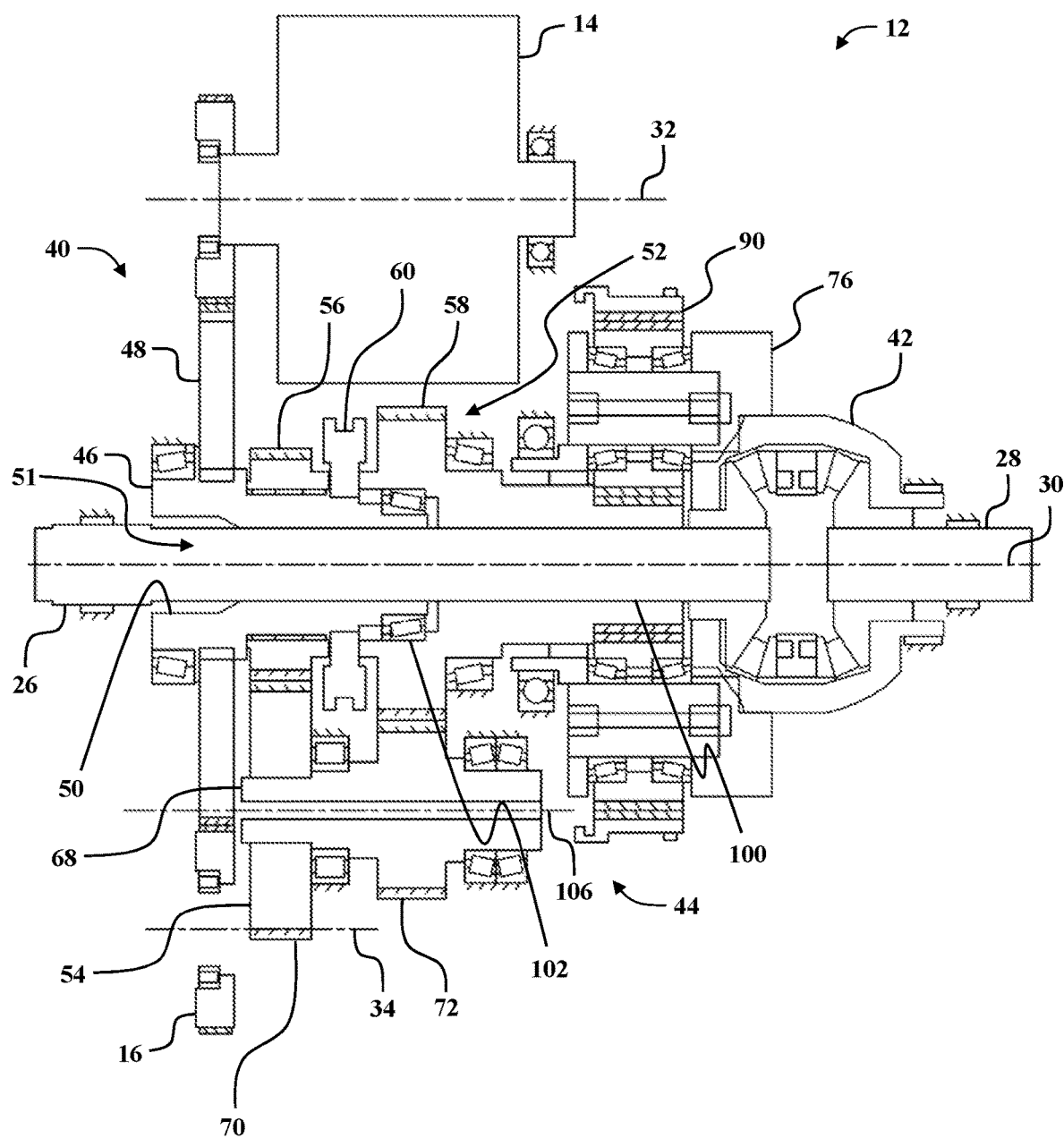
Figure 15:
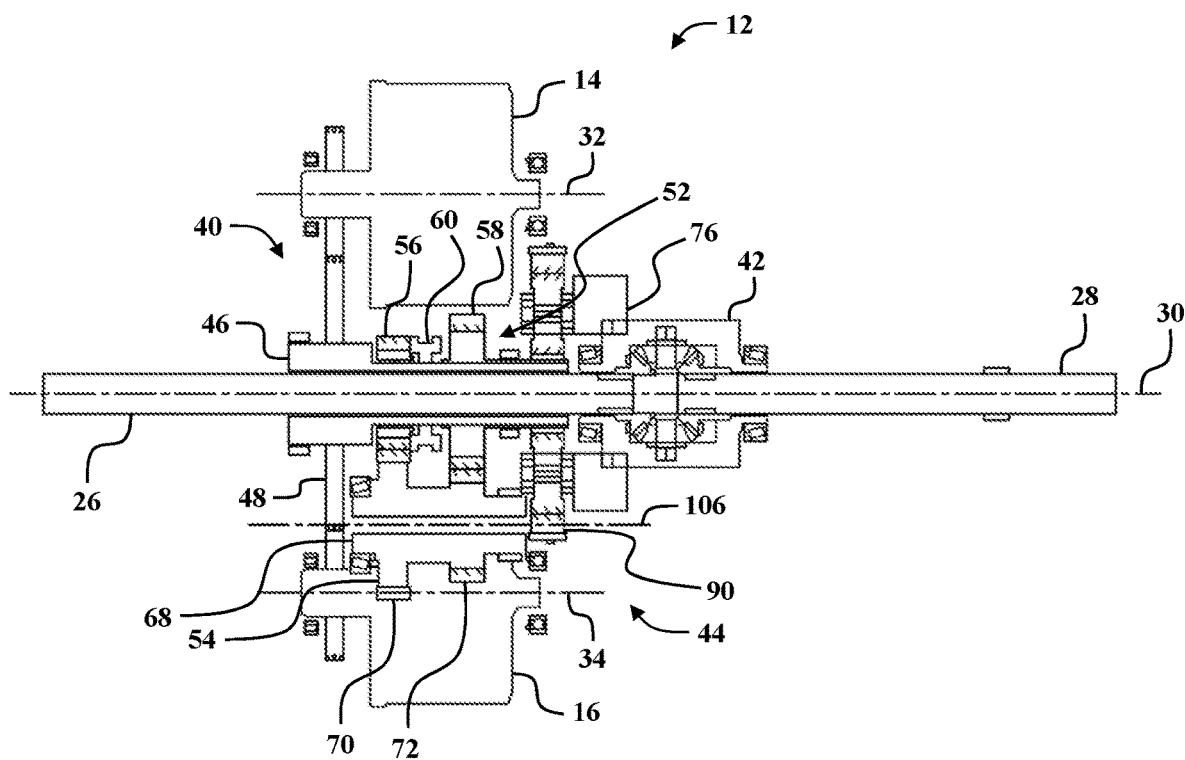
Figure 16:
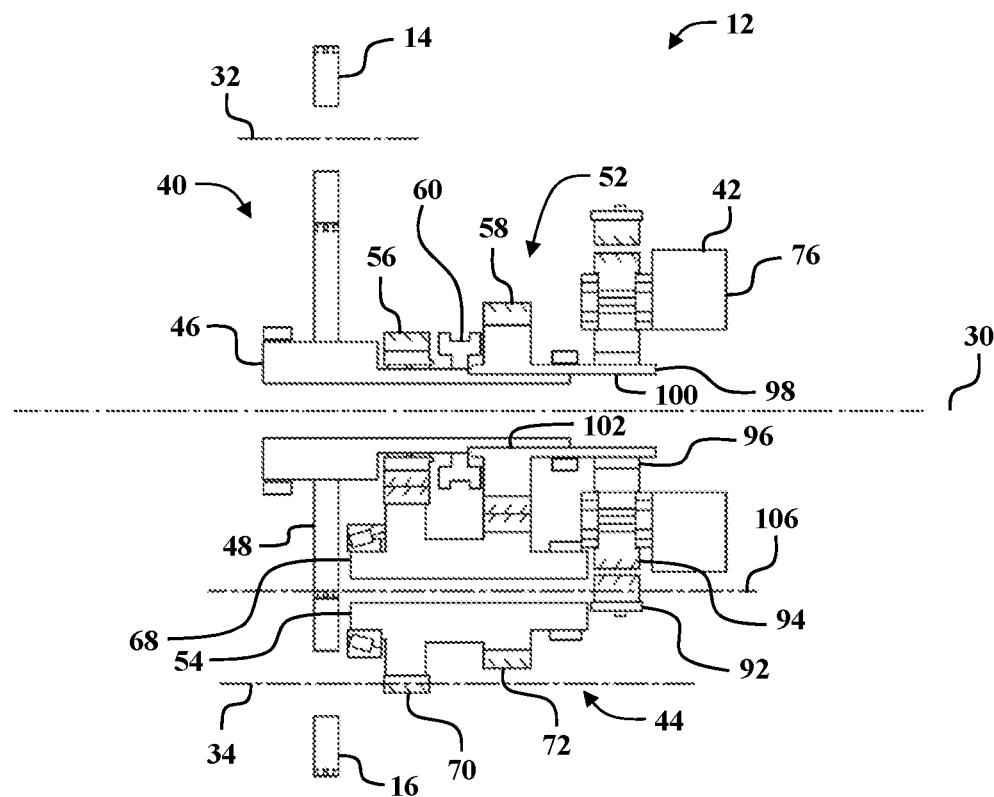
Figure 17:
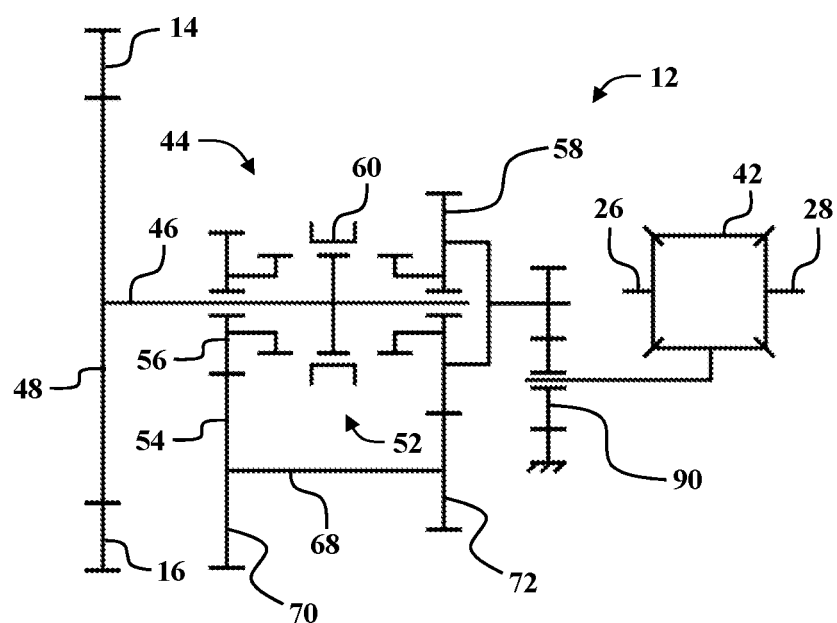
FIG. 17 is a schematic diagram of the reduction assembly shown in FIGS. 2 and 12, according to embodiments of the present invention.

With reference to FIGS. 2-19, in one embodiment, the reduction assembly 12 includes a planetary gear set 90 that is coupled between the speed change mechanism 44 and the differential gear set 42 for driving the differential gear set 42. The planetary gear set 90 includes a planetary ring gear 92, planetary gears 94, a sun gear 96, and a planetary gear shaft 98. The planetary ring gear 92 is arranged about the first axis of rotation 30 and is rotatably fixed in position. The planetary gear shaft 98 is coupled between the sun gear 96 and the second reduction gear 58 such that each rotate about the first axis of rotation 30 at the same speed. The planetary gear shaft 98 is orientated coaxially with the first axis of rotation 30 and is rotatable about the input shaft 46. The planetary gear shaft 98 extends between a first shaft end 100 and a second shaft end 102. The first shaft end 100 is fixedly coupled to the second reduction gear 58, and the sun gear 96 is fixedly coupled to the second shaft end 102. Each of the planetary gears 94 is radially arranged about the sun gear 96 and engaged with the sun gear 96 and the planetary ring gear 92. The planetary gears 94 are rotatably supported on the ring gear 76 of the differential gear set 42 to transfer torque to the differential gear set 42. Rotation of the planetary gear shaft 98 rotates the sun gear 96, which rotates the planetary gears 94. The planetary gears 94 are constrained by the planetary ring gear 92 and orbit the first axis of rotation 30 causing the differential gear set 42 to rotate. In one embodiment, as shown in FIG. 14B, the second shaft end 102 may be at least partially supported from the input shaft 46 of the common gear reduction 40 with a tapered bearing positioned between the outer surface of the input shaft 46 and the inner surface of the planetary gear shaft 98.

Figure 18:
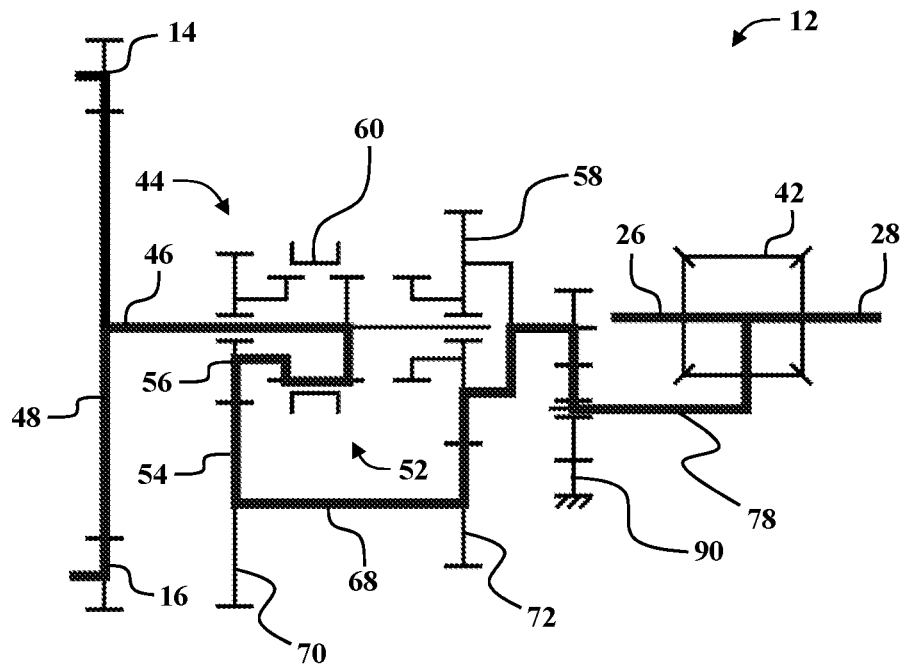
FIG. 18 is a schematic diagram of the reduction assembly shown in FIGS. 2 and 12 illustrating power flow of a first ratio.

Referring specifically to FIG. 18, with the reduction assembly 12 in the first ratio 78, torque that is generated in one or both of the electric machines 14, 16 is transferred to the input shaft 46 via the drive pinions 20 and the input drive wheel 48. The input shaft 46 rotates the shift sleeve 62, which is engaged with the first reduction gear 56. The first reduction gear 56 is engaged with the first output gear 70 to transfer torque to the output counter shaft 68. Rotation of the output counter shaft 68 is transferred to the planetary gear shaft 98 via the engagement of the second output gear 72 and the second reduction gear 58. The planetary gear shaft 98 rotates the sun gear 96 at the same rate as the second reduction gear 58. The sun gear 96 causes the planetary gears 94 to rotate and orbit within the planetary ring gear 92, thereby rotating the differential gear set 42 and axle shafts 26, 28.

Figure 19:
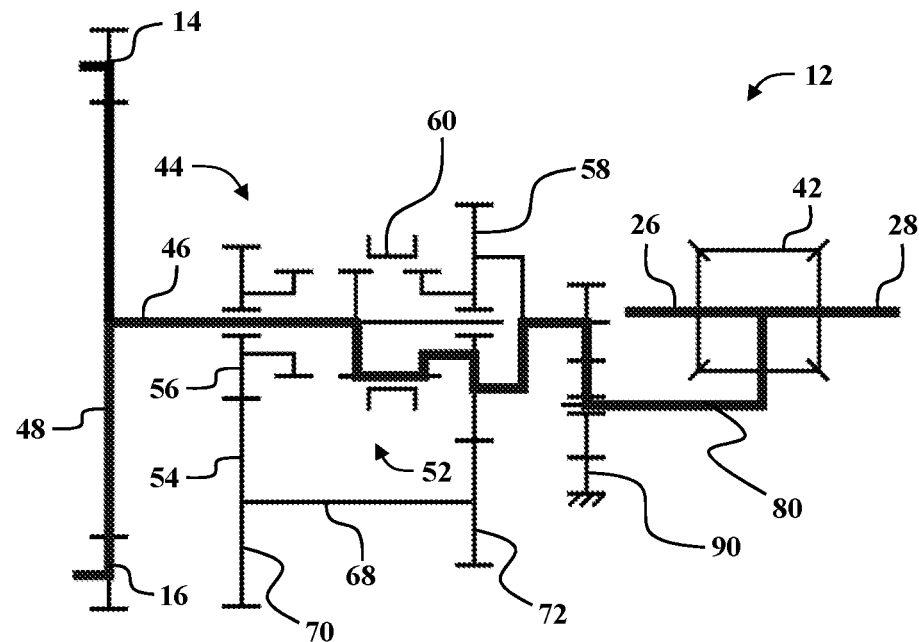
FIG. 19 is a schematic diagram of the reduction assembly shown in FIGS. 2 and 12 illustrating power flow of a second ratio.
Figure 20:
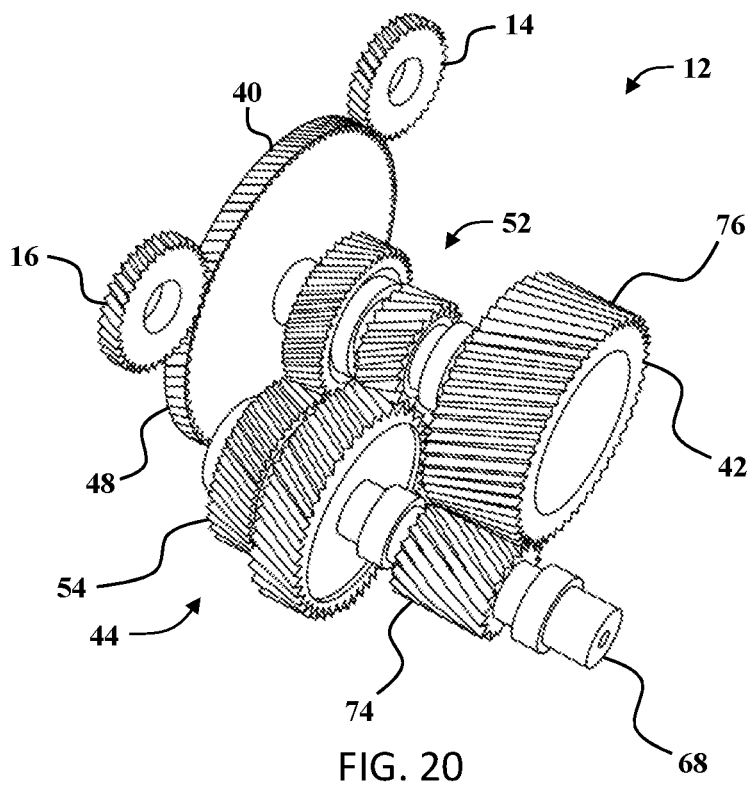
FIG. 20 is perspective views of a reduction assembly that may be used with the axle assembly shown in FIG. 1, according to an embodiment of the present invention.
Figure 21:
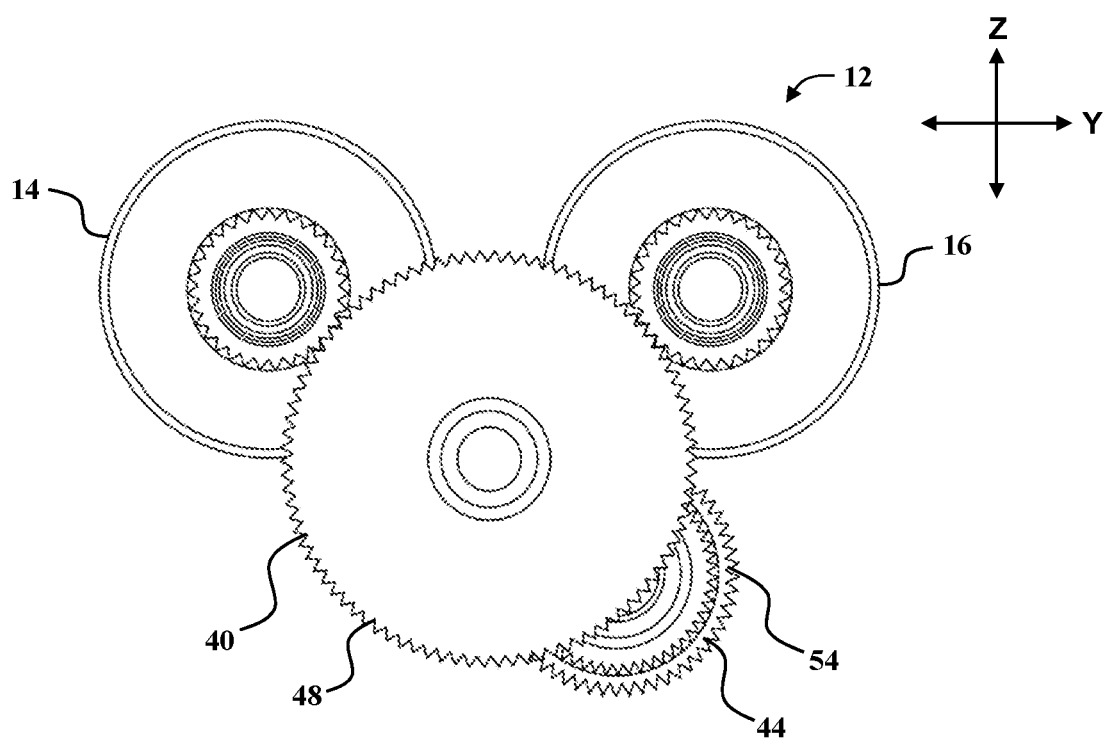
FIG. 21 is a front elevation view of the reduction assembly shown in FIG. 20.
Figure 22:
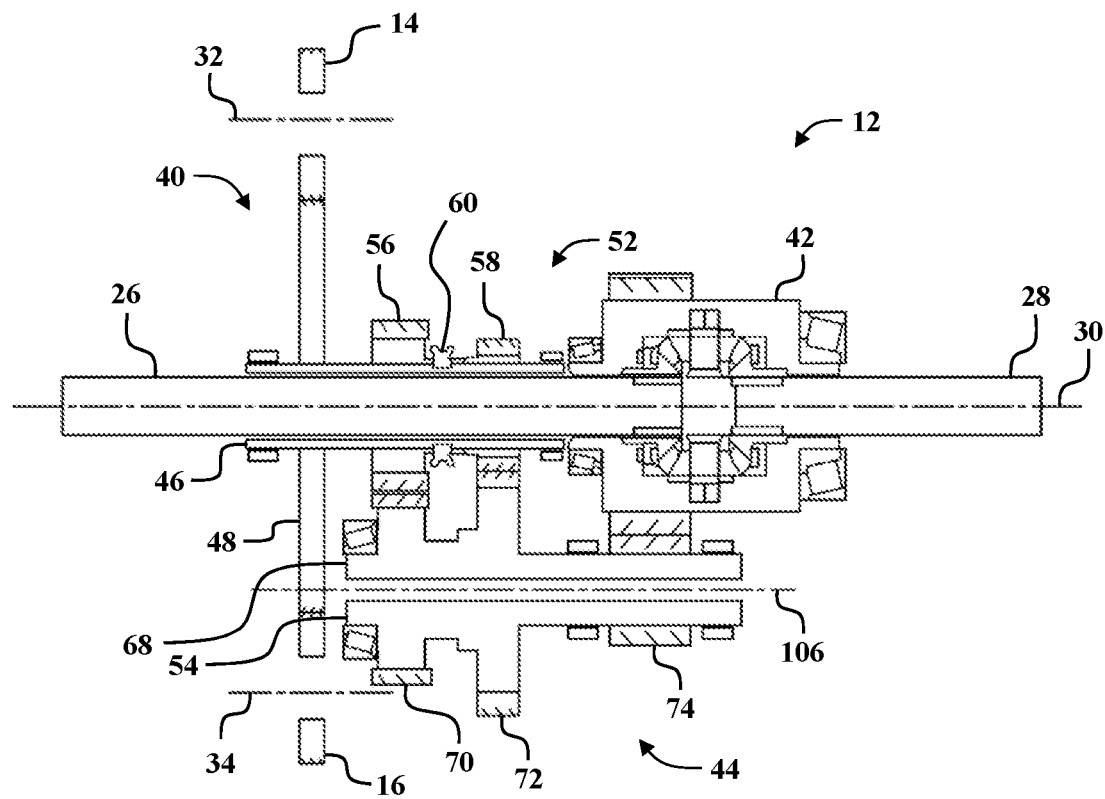
FIG. 22 is a sectional view of the reduction assembly shown in FIG. 20, according to an embodiment of the present invention.
Figure 23:
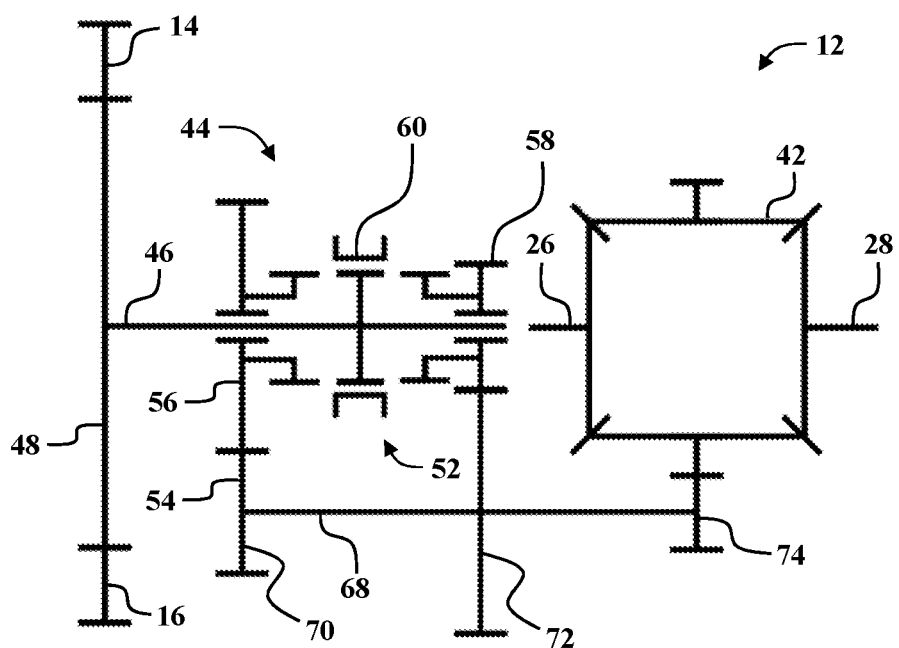
FIG. 23 is a schematic diagram of the reduction assembly shown in FIG. 22, according to an embodiment of the present invention.

Referring specifically to FIG. 19, with the reduction assembly 12 in the second ratio 80, torque that is generated in one or both of the electric machines 14, 16 is transferred to the input shaft 46 via the drive pinions 20 and the input drive wheel 48. The input shaft 46 rotates the shift sleeve 62, which is engaged with the second reduction gear 58. As the second reduction gear 58 is coupled to the planetary gear shaft 98, the input shaft 46, the planetary gear shaft 98, and the sun gear 96 all rotate at the same speed. Rotation of the sun gear 96 causes the planetary gears 94 to rotate and orbit within the planetary ring gear 92, thereby rotating the differential gear set 42 and axle shafts 26, 28.

With reference to FIGS. 2-10, in the exemplary embodiment, the axle assembly 10 defines a three-dimensional Cartesian coordinate system that includes three mutually perpendicular axes X, Y, and Z that extend through the axle assembly 10. Specifically, the X-axis is orientated to extend substantially parallel with the axle centerline 24, the Y-axis is oriented to extend substantially perpendicular to the X-axis, and the Z-axis is oriented substantially perpendicular to the X-axis and the Y-axis.

In the illustrated embodiment, The first electric machine 14 and the second electric machine 16 are orientated in a same direction. The common gear reduction 40 is rotatable about a fourth axis of rotation 104 and is driven by the first and second electric machines 14, 16. In the illustrated embodiment, the fourth axis of rotation 104 is orientated coaxially with the first axis of rotation 30. The differential gear set 42 is disposed about the first axis of rotation 30 and is coupled to and driven by the common gear reduction 40 to transfer rotational torque from the first and second electric machines 14, 16 to the first and second axle shafts 26, 28. The speed change mechanism 44 is coupled between the common gear reduction 40 and the differential gear set 42 to change the rotational torque that is transferred to the first and second axle shafts 26, 28. The speed change mechanism 44 includes the reduction gear set 52 that is rotatable about the first axis of rotation 30 and is driven by the common gear reduction 40, and the output gear set 54 that is rotatable about a fifth axis of rotation 106 and driven by the reduction gear set 52. The fifth axis of rotation 106 is substantially parallel with the first axis of rotation 30. For example, the input shaft 46 rotates about the fourth axis of rotation 104 that is coaxial with the first axis of rotation 30, and the output counter shaft 68 rotates about the fifth axis of rotation 106 that is parallel and spaced from the first axis of rotation 30.

Figure 9:
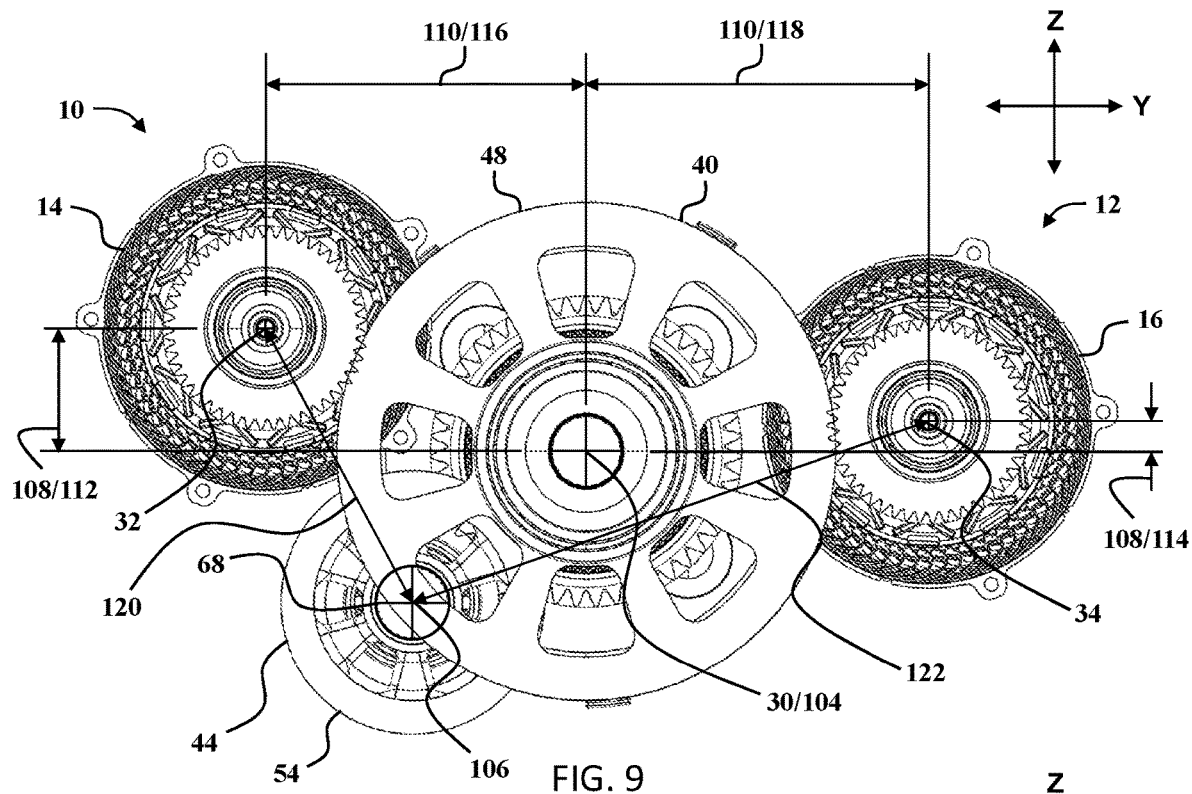
FIG. 9 is a front elevation view of the reduction assembly shown in FIG. 2.
Figure 10:
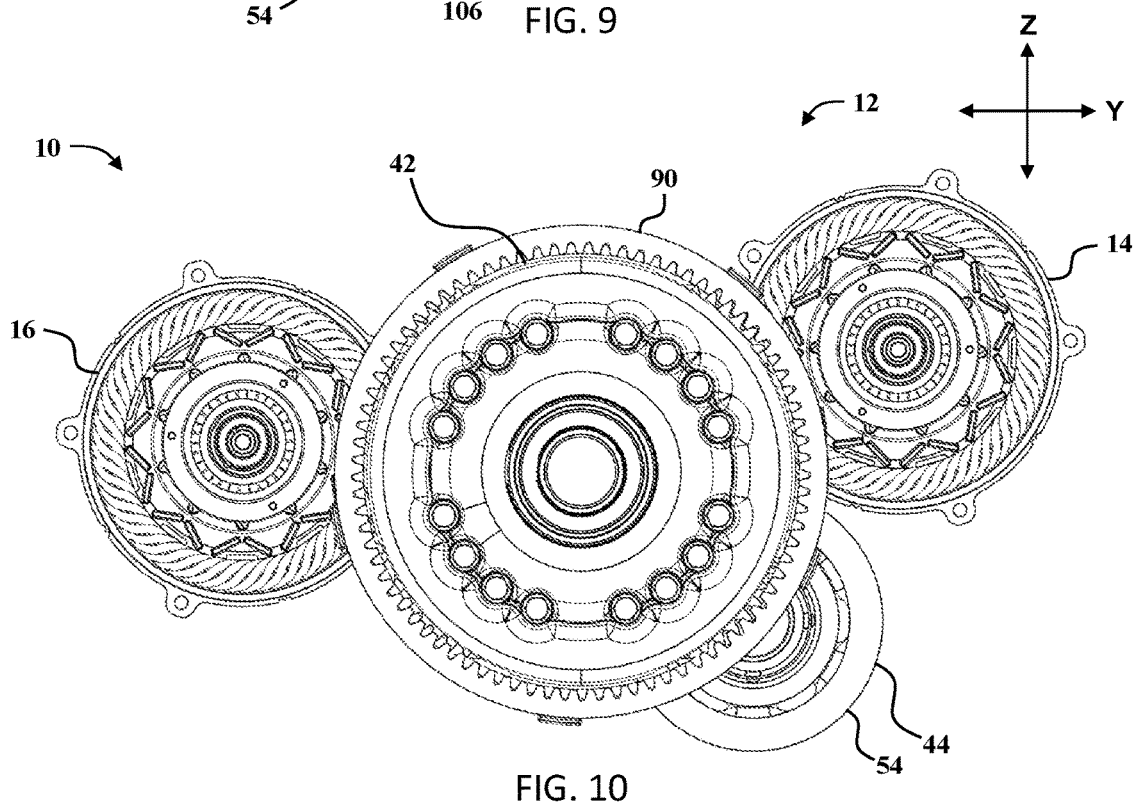
FIG. 10 is a rear elevation view of the reduction assembly shown in FIG. 2.
Figure 11:
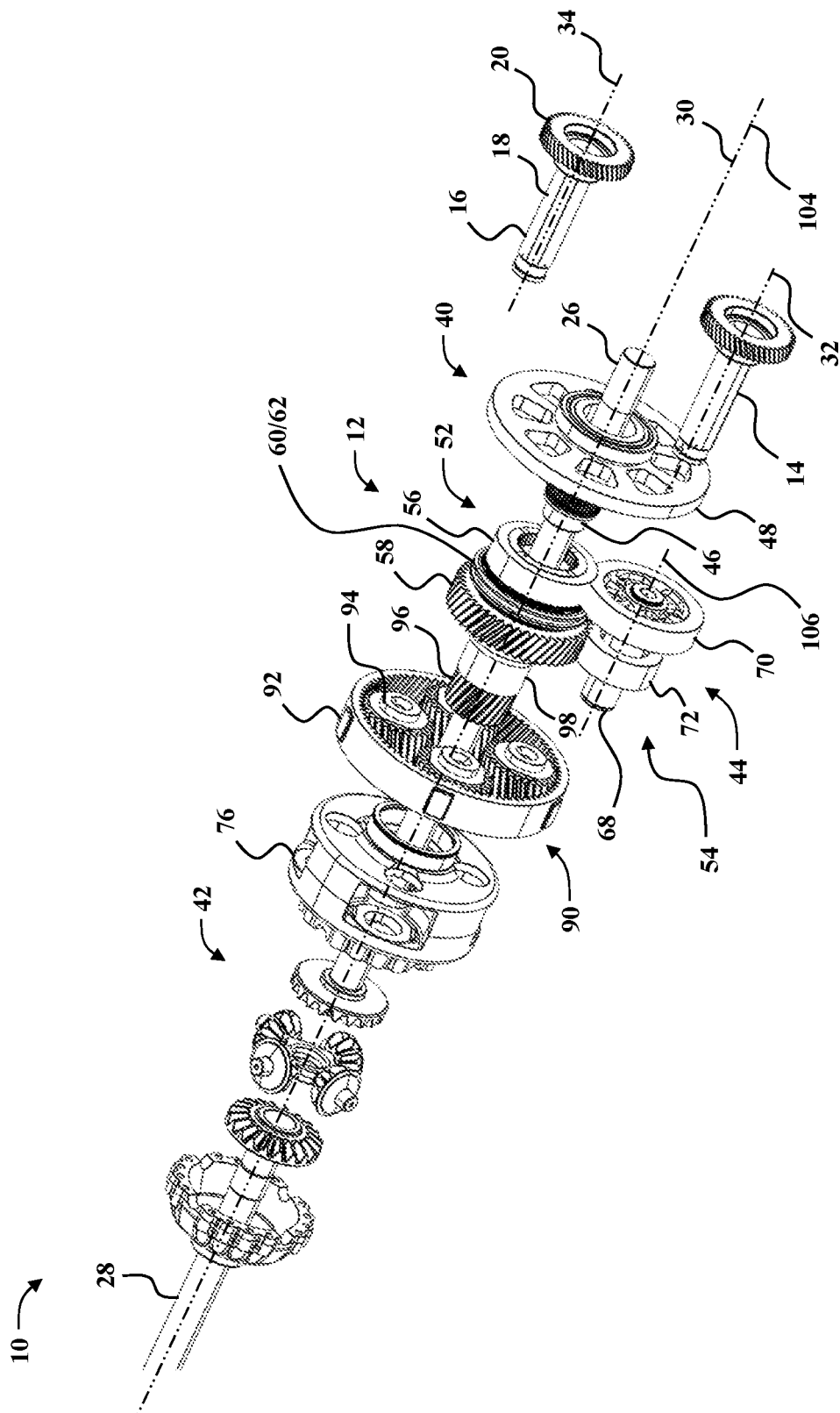
FIG. 11 is an exploded perspective view of the reduction assembly shown in FIG. 2.
Figure 12:
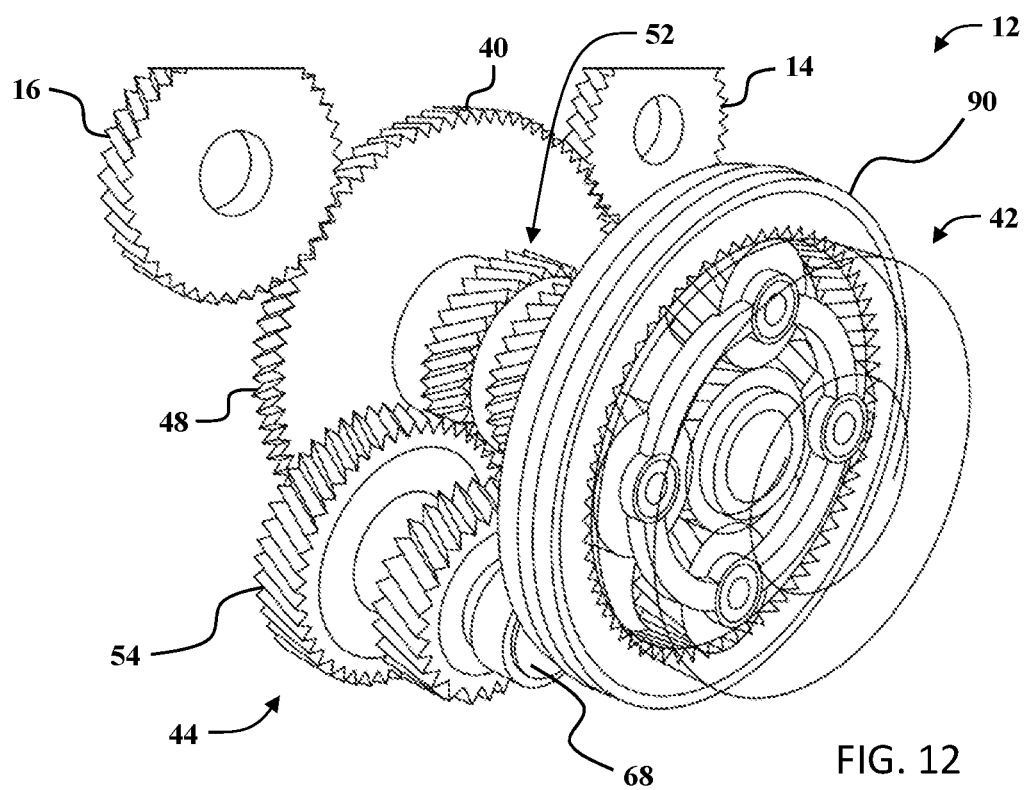
FIG. 12 is perspective views of a portion of the reduction assembly show in FIG. 2, according to an embodiment of the present invention.

With reference to FIG. 9, in the illustrated embodiment, each electric machine 14, 16 is spaced a vertical distance 108 from the axle shafts 26, 28 along a vertical Z-axis, and spaced a horizontal distance 110 from the axle shafts 26, 28 along a horizontal Y-axis. For example, the second axis of rotation 32 of the first electric machine 14 and the third axis of rotation 34 of the second electric machine 16 are each spaced a vertical distance 108 from the first axis of rotation 30 of the axle shafts 26, 28 as measured along the vertical Z-axis. In one embodiment, as shown in FIG. 13, each electric machine 14, 16 is spaced the same vertical distance from the axle shafts 26, 28. In another embodiment, as shown in FIG. 9, the first electric machine 14 is spaced a first vertical distance 112 from the axle shafts 26, 28 and the second electric machine 16 is spaced a second vertical distance 114 from the axle shafts 26, 28 that is different from the first vertical distance 112. In addition, as shown in FIG. 9, the rotor shaft 18 of each electric machine 14, 16 is spaced a horizontal distance 110 from the axle shafts 26, 28 as measured along a horizontal Y-axis. For example, the second axis of rotation 32 of the first electric machine 14 and the third axis of rotation 34 of the second electric machine 16 are each spaced a horizontal distance 110 from the first axis of rotation 30 of the axle shafts 26, 28 as measured along the horizontal Y-axis. In one embodiment, as show in FIG. 13, each electric machine 14, 16 is spaced the same horizontal distance from the axle shafts 26, 28. In another embodiment, as shown in FIG. 9, the first electric machine 14 is spaced a first horizontal distance 116 from the axle shafts 26, 28 and the second electric machine 16 is spaced a second horizontal distance 118 from the axle shafts 26, 28 that is different from the first horizontal distance 116.

With reference to FIG. 9, in the illustrated embodiment, the second axis of rotation 32 of the first electric machine 14 and the third axis of rotation 34 of the second electric machine 16 are orientated at a same radial distance from the first axis of rotation 30. The second axis of rotation 32 is spaced a first horizontal distance 116 from the first axis of rotation 30 and the third axis of rotation 34 is spaced a second horizontal distance 118 from the first axis of rotation 30 that is different than the first horizontal distance 116. In addition, the second axis of rotation 32 of the first electric machine 14 is spaced a first vertical distance 112 from the first axis of rotation 30 and the third axis of rotation 34 of the second electric machine 16 is spaced a second vertical distance 114 from the first axis of rotation 30 that is different than the first vertical distance 112.

Figure 6:
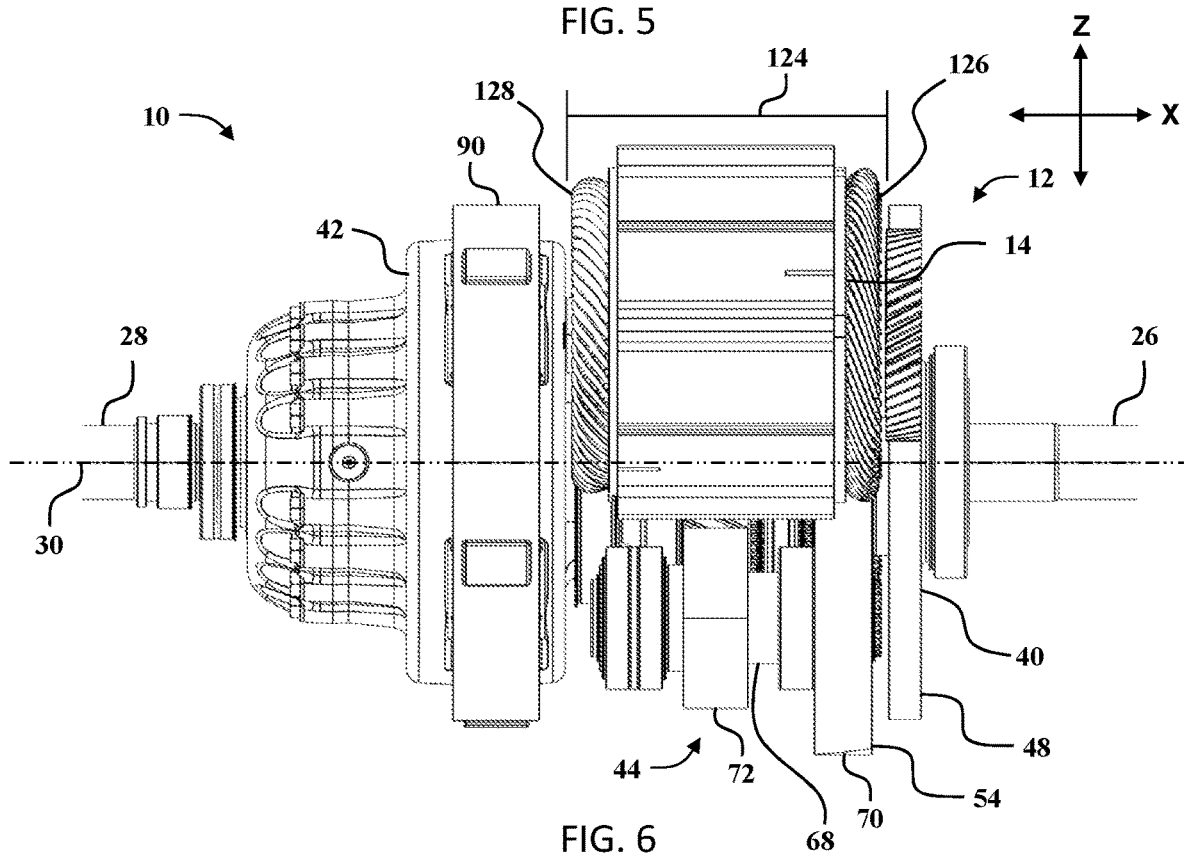
FIG. 6 is left side elevation view of the reduction assembly shown in FIG. 2.
Figure 7:
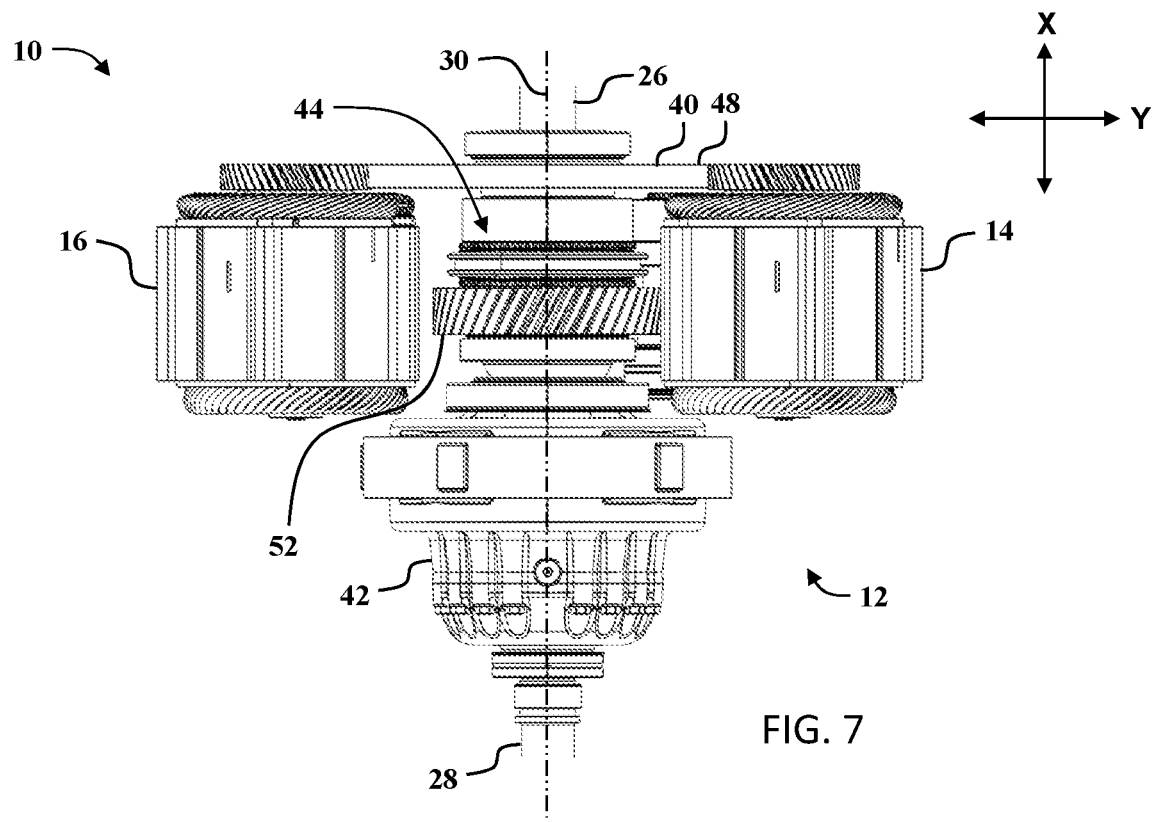
FIG. 7 is a top elevation view of the reduction assembly shown in FIG. 2.
Figure 8:
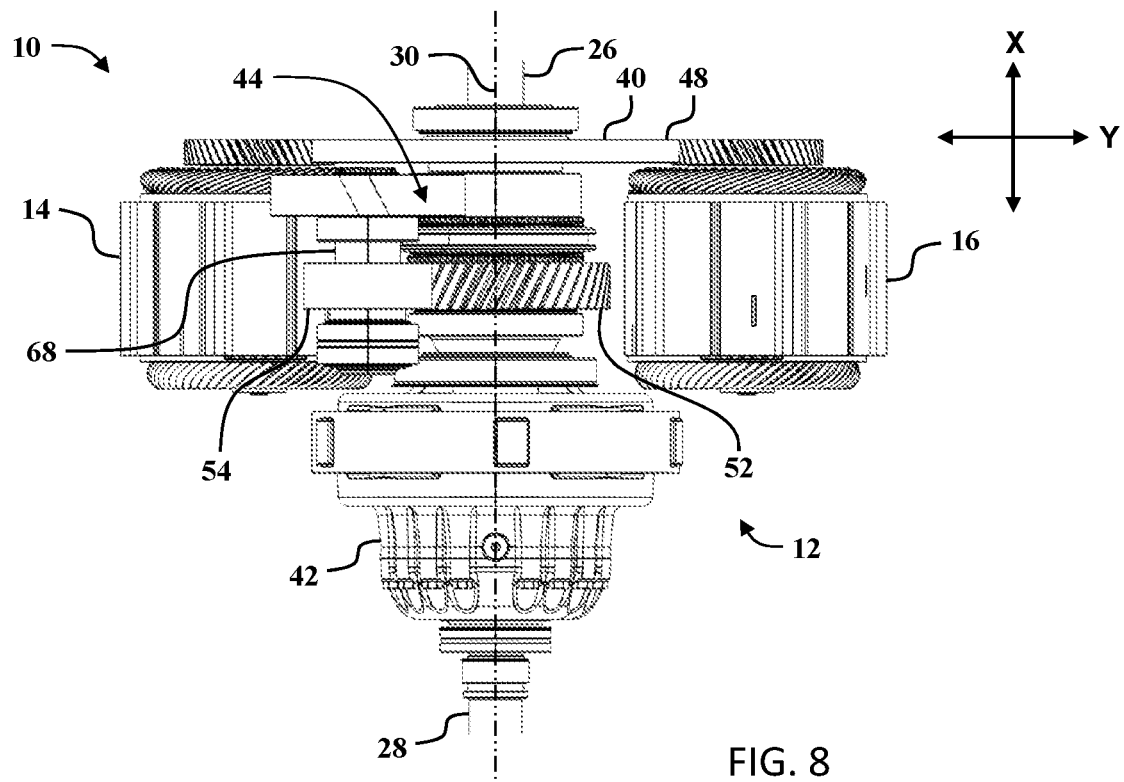
FIG. 8 is a bottom elevation view of the reduction assembly shown in FIG. 2.

In the illustrated embodiment, the speed change mechanism 44 is orientated between the first electric machine 14 and the second electric machine 16 along the horizontal Y-axis. In addition, the fifth axis of rotation 106 of the output gear set 54 is spaced a first radial distance 120 from the second axis of rotation 32 of the first electric machine 14 and a second radial distance 122 from the third axis of rotation 34 of the second electric machine 16 that is different from the first radial distance 120. In one embodiment, as shown in FIG. 6, the first and second electric machines 14, 16 include a length 124 defined along the X-axis between a first end 126 and a second end 128. The common gear reduction 40 is positioned at the first end 126 of the first and second electric machines 14, 16 and the differential gear set 42 is positioned at the opposite second end 128 of the first and second electric machines 14, 16, such that the first and second electric machines 14, 16 are orientated between the input drive wheel 48 and the differential gear set 42 along the X-axis.

In an embodiment, in which the axle assembly includes the second output gear set 82, the second output gear set 82 is rotatable about a sixth axis of rotation 130 (shown in FIG. 28) that is substantially parallel with the first axis of rotation 30 and driven by the reduction gear set 52.

Referring to FIGS. 33-45, in the illustrated embodiment, the axle assembly 10 includes a drive unit housing 150 enclosing the reduction assembly 12 therein. The drive unit housing 150 includes a plurality of sidewalls 152 that extent between a first side 154 and a second side 156, and between an upper portion 158 and a lower portion 160. The drive unit housing 150 also includes an inner surface 162 that defines an interior cavity 164 enclosing the first and second electric machines 14, 16, the common gear reduction 40, the differential gear set 42, and the speed change mechanism 44 within the interior cavity 164. The first and second axle shafts 26, 28 are partially disposed within the interior cavity 164 and extend out of the drive unit housing 150 is opposite directions. In one embodiment, the axle assembly 10 may include an integrated oil cooler & pump system for circulation cooling fluid within the drive unit housing 150 for cooling the reduction assembly 12.

Figure 41:
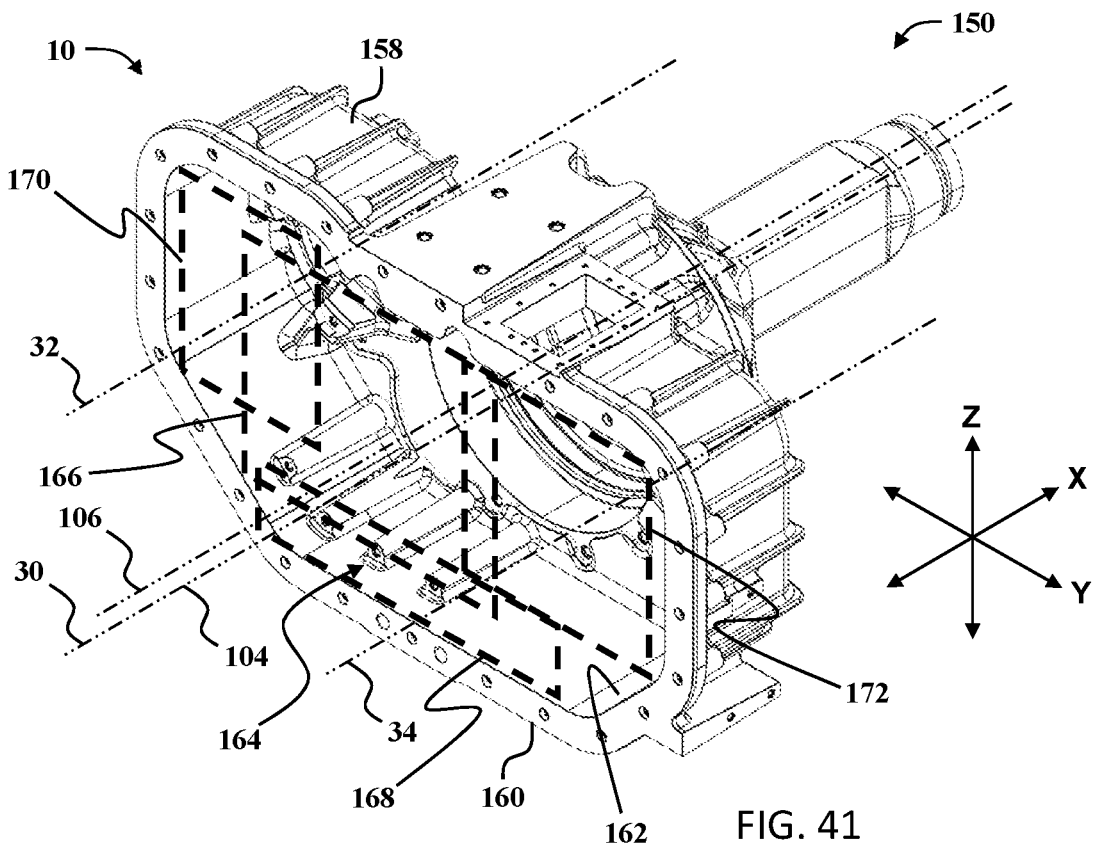
FIG. 41 is a perspective view of a portion of the drive unit housing shown in FIG. 32.
Figure 42:
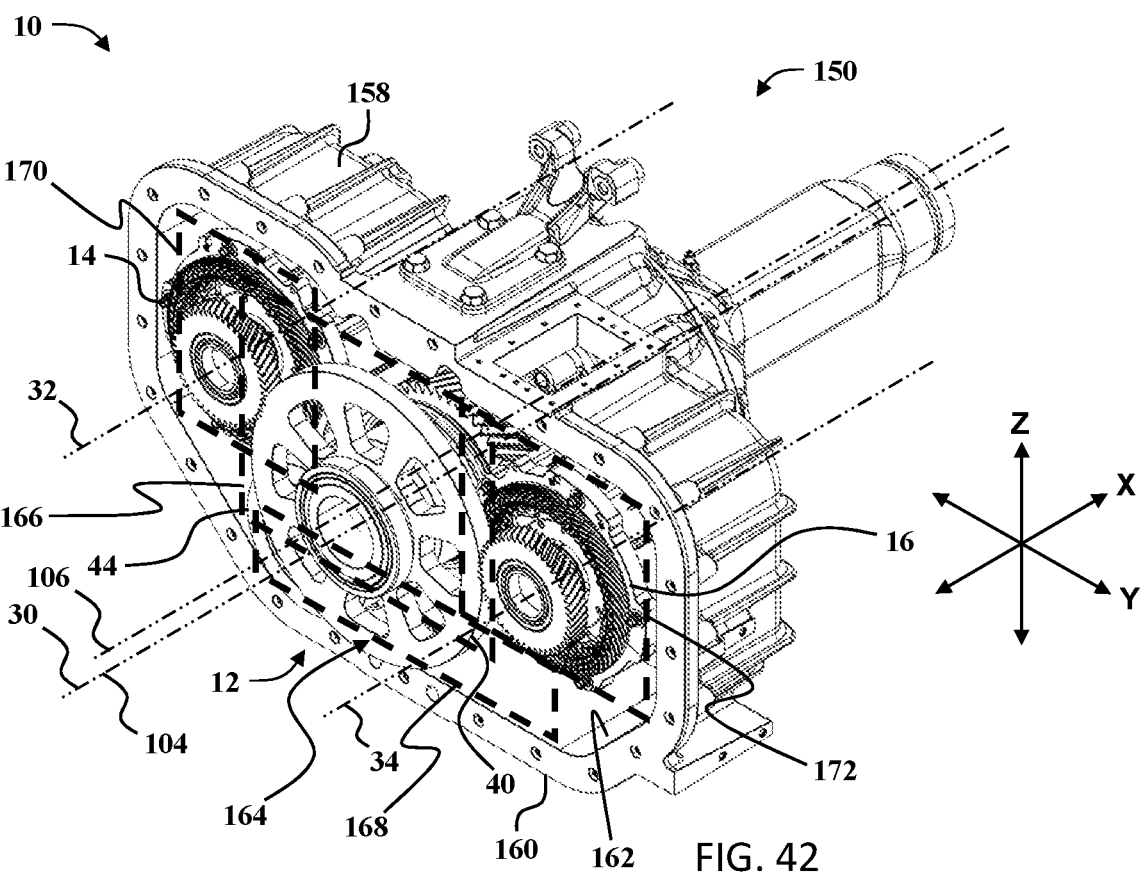
FIG. 42 is a perspective view of a portion of the axle assembly show in FIG. 1, according to an embodiment of the present invention.
Figure 43:
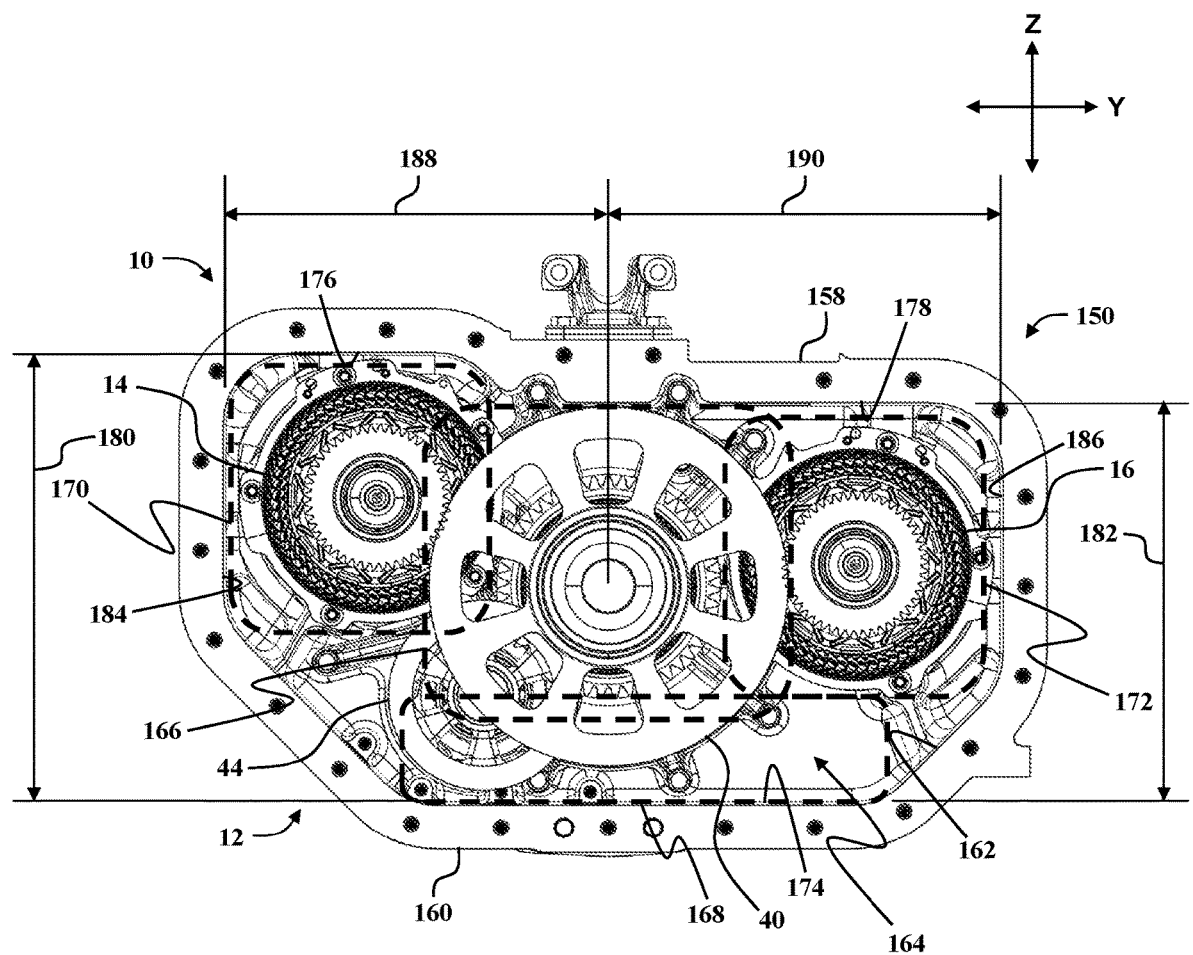
FIG. 43 is a front elevation view of the axle assembly show in FIG. 42, according to an embodiment of the present invention.

In the illustrated embodiment, with reference to FIGS. 41-43, the interior cavity 164 of the drive unit housing 150 includes a central cavity represented by area 166, a lower cavity represented by area 168, a first machine cavity represented by area 170, and a second machine cavity represented by area 172. The central cavity 166 includes the fourth axis of rotation 104 of the common gear reduction 40 and the first axis of rotation 30 of the first and second axle shafts 26, 28 disposed within the central cavity 166. The lower cavity 168 is disposed below the central cavity 166 and is configured to accumulate a volume of gearbox fluid with the speed change mechanism 44 at least partially immersed in the lower cavity 168, and with the first and second electric machines 14, 16 spaced from the lower cavity 168. For example, the reduction gear set 52 of the speed change mechanism 44 may be disposed within the central cavity 166 and the output gear set 54 of the speed change mechanism 44 may be disposed within the lower cavity 168, with the output gear set 54 partially immersed within the accumulated volume of gearbox fluid.

The first machine cavity 170 is disposed above the lower cavity 168 and is adjacent to the central cavity 166 on one side of the first axis of rotation 30. The first machine cavity 170 includes the second axis of rotation 32 of the first electric machine 14 disposed within the first machine cavity 170. The second machine cavity 172 includes the third axis of rotation 34 of the second electric machine 16 disposed within the second machine cavity 172. The second machine cavity 172 is disposed above the lower cavity 168 and is adjacent to the central cavity 166 on an opposing side of the first axis of rotation 30 from the first machine cavity 170. In one embodiment, the second machine cavity 172 is at least partially above the first machine cavity 170 with the third axis of rotation 34 of the second electric machine 16 disposed within the second machine cavity 172.

In the illustrated embodiment, the inner surface 162 of the drive unit housing 150 includes a lower inner surface 174 that partially defines the lower cavity 168, a first upper inner surface 176 that partially defines the first machine cavity 170, and a second upper inner surface 178 that partially defines the second machine cavity 172. The first upper inner surface 176 spaced a first vertical distance 180 from the lower inner surface 174 and the second upper inner surface 178 is spaced a second vertical distance 182 from the lower inner surface 174 that is greater than the first vertical distance 180. In addition, the first upper inner surface 176 is positioned a vertical distance from the first axis of rotation 30 that is greater than the vertical distance from the second upper inner surface 178 to the first axis of rotation 30.

The inner surface 162 of the drive unit housing 150 also includes a first end surface 184 that partially defines the first machine cavity 170 and an opposite second end surface 186 that partially defines the second machine cavity 172. The first end surface 184 of the first machine cavity 170 is spaced a first horizontal distance 188 from the first axis of rotation 30, and the second end surface 186 of the second machine cavity 172 is spaced a second horizontal distance 190 from the first axis of rotation 30 that is greater than the first horizontal distance 188 of the first end surface 184.

In one embodiment, the axle assembly 10 includes a first support member 192 that is mounted to the first side 154 of the drive unit housing 150, and a second support member 194 that is mounted to the second side 156 of the drive unit housing 150. The axle assembly 10 also includes an axle support coupling assembly 196 that is configured to couple the first support member 192 and the second support member 194 to the drive unit housing 150 such that forces experienced by the drive unit housing 150 are transferred to the first and second support members 192, 194.

In the illustrated embodiment, the first support member 192 mounted to the first side 154 of the drive unit housing 150 and includes a first flange 198 that extends to the lower portion 160 of the drive unit housing 150. The second support member 194 is mounted to the second side 156 of the drive unit housing 150 and includes a second flange 200 that extends to the lower portion 160 of the drive unit housing 150. The coupling assembly 196 includes a plurality of interior support cavities 202 that extend though the lower portion 160 of the drive unit housing 150 from the first side 154 to the second side 156, and a plurality of fastener assemblies 203 that are inserted through the interior support cavities 202 and mounted to both of the first and second flanges 198, 200 thereby supporting the entire drive unit housing 150 such that forces experienced by the drive unit housing 150 are transferred to the first and second support members 192, 194.

In one embodiment, the axle assembly 10 includes a two-piece drive unit housing 150 having including a base unit 204 and a cover 206 that is coupled to the base unit 204 to define the interior cavity 164. As shown, the base unit 204 is deeper than the cover 206. It is to be appreciated, that the base unit 204 and the cover 206 may be of any suitable size and may be equal halves of the drive unit housing 150 without deviating from the overall scope of the invention. The cover 206 is coupled to the base unit 204 with a plurality of fasteners extending around a perimeter of the cover 206. The first support member 192 is coupled to the cover 206 and includes a first shaft opening 208 with the first axle shaft 26 extending through the first shaft opening 208 and having the first flange 198 extending to the lower portion of the cover 206. The second support member 194 is coupled to the base unit 204 and includes a second shaft opening 210 with the second axle shaft 28 extending through the second shaft opening 210 and having the first flange 198 extending to the lower portion of the base unit 204. The plurality of interior support cavities 202 extend through the lower portions of the base unit 204 and the cover 206. The plurality of fastener assemblies 203 are inserted through the interior support cavities 202 and mounted to both of the first and second flanges 198, 200 to couple the first support member 192, the second support member 194, the base unit 204, and the cover 206 together.

The first and second support members 192, 194 are each coupled to the drive unit housing 150 and extend outwardly from the drive unit housing 150 in opposite directions along the axle centerline 24. Each support member 192, 194 is coupled to the drive unit housing 150 and the corresponding axle shafts 26, 28 extending through each support member 192, 194 coaxial with the axle centerline 24.

The coupling assembly 196 is formed along the lower portion 160 of the drive unit housing 150 and includes the plurality of interior support cavities 202 that extend though the drive unit housing 150, and the plurality of fastener assemblies 203 inserted through the interior support cavities 202. Each interior support cavity 202 extends through the cover 206 and the base unit 204, and is sized and shaped to receive a corresponding fastener assembly 203 therethrough to facilitate coupling the first support member 192 to the second support member 194.

In one embodiment, the first support member 192 includes a center portion having a substantially domed-shaped first outer surface 212 and a mounting flange 214 that extends outwardly from the center portion. The mounting flange 214 includes a plurality of openings defined along a perimeter of the mounting flange 214 that are each sized and shaped to receive corresponding fasteners therethrough to facilitate coupling the first support member 192 to the cover 206. The first flange 198 extends radially outwardly from the center portion towards the lower portion 160 of the cover 206. The first flange 198 includes a plurality of support openings that are sized and shaped to receive a corresponding fastener assembly 203 therethrough. The first support member 192 may also include a plurality of first support ribs 216 defined along the first outer surface 212 of the center portion. The first support ribs 216 extend outwardly from the center portion towards an outer edge of the first support member 192. In the illustrated embodiment, the outer edge of the first support member 192 is defined by the first flange 198 and the mounting flange 214 and includes a cross-section having a substantially teardrop shape.

The second support member 194 includes a center portion having a substantially domed-shaped second outer surface 218 and a mounting flange 220 that extends outwardly from the center portion. A plurality of openings are defined along a perimeter of the mounting flange 220 and are each sized and shaped to receive corresponding fasteners therethrough to facilitate coupling the second support member 194 to the base unit 204. The second flange 200 extends radially outwardly from the center portion towards the lower portion 160 of the base unit 204. The second flange 200 includes a plurality of support openings that are each sized and shaped to receive a corresponding fastener assembly 203 therethrough. A plurality of second support ribs 222 are defined along the second outer surface 218 of the center portion and extend outwardly from the center portion towards an outer edge of the second support member 194. The outer edge of the second support member 194 is defined by the second flange 200 and the mounting flange 220 and includes a cross-section having a substantially teardrop shape.

In the illustrated embodiment, each fastener assembly 203 includes a support bolt/rod 224 that is inserted through a corresponding interior support cavity 202 and extends outwardly from a corresponding first support opening 226 defined through the first flange 198 and a corresponding second support opening 228 defined through the second flange 200. Each end of the support bolt 224 includes a threaded portion. A fastening nut and washer 226 is coupled to each end of the support bolt 224 and is configured to couple the first support member 192 to the second support member 194, and to compress the first support member 192 and the second support member 194 towards the drive unit housing 150. For example, as each fastening nut is tightened, the fastening nut and washer assembly 226 contacts an outer surface of the corresponding flanges 198, 200 to compress the first support member 192 and the second support member 194 towards the drive unit housing 150.

In one embodiment, the axle assembly 10 may also include a first axle tube 230 and a second axle tube 232. The first axle tube 230 extends outwardly from the center portion of the first support member 192 along the axle centerline 24. The plurality of first support ribs 216 are defined along the outer surface of the center portion and extend from the first axle tube 230 towards the first flange 198. The second axle tube 232 that extends outwardly from the center portion of the second support member 194 along the axle centerline 24. The plurality of second support ribs 222 are defined along the outer surface of the center portion and extend from the second axle tube 232 towards the second flange 200.

The weight and loads experienced by the drive unit housing 150, which is preferably formed of aluminum, are carried by the coupling assembly 196 and first and second support members 192, 194, which are preferably formed of steel. In particular, the weight and loads experienced by the drive unit housing 150 are carried by the support members 192, 194, bolts 224, the flanges 198, 200, and axle tubes 230, 232. This configuration allows the drive unit housing 150 to be formed of a lightweight material, such as aluminum. As mentioned above, the first support member 192, the second support member, and the fastener assemblies 203 are preferably formed of steel. In other embodiments, the first and second support members 192, 194, the fastener assemblies 203, and the drive unit housing 150 can be formed of alternative materials and/or combination of suitable materials.

Referring to FIGS. 46-49, in one embodiment, the present invention includes a vehicle assembly 300 including a frame rail assembly 302 and the axle assembly 10. The frame rail assembly 302 includes a pair of parallel frame rails 304, 306 and a plurality of cross beams 308 that are coupled to the parallel frame rails 304, 306. The parallel frame rails 304, 306 are orientated along a longitudinal axis 310 of the vehicle assembly 300 and are spaced apart along a transverse axis 312 of the vehicle assembly 300 that is perpendicular to the longitudinal axis 310.

The plurality of cross beams 308 are coupled between the pair of parallel frame rails 304, 306 and are spaced along the longitudinal axis 310 to define a plurality of equipment cavities 314. For example, in the illustrated embodiment, the plurality of cross beams 308 includes a first cross beam 316 and a second cross beam 318 that is spaced from the first cross beam 316 along the longitudinal axis 310 such that an equipment cavity 314 is defined between the interior surfaces of the pair of parallel frame rails 304, 306, the first cross beam 316, and the second cross beam 318. The drive unit housing 150 is mounted to the frame rail assembly 302 such that the drive unit housing 150 is positioned within the equipment cavity 314 and is orientated below a horizontal plane that is defined by the first and second cross beams 316, 318.

In the illustrated embodiment, the vehicle assembly 300 includes a plurality of suspension components that are mounted to the frame rails 304, 306 and are positioned within the equipment cavity 314. For example, the plurality of suspension components may include a first group of suspension components 320 that are coupled to a first frame rail 304 of the pair of parallel frame rails, and a second group of suspension components 322 that are coupled to a second frame rail 306 of the pair of parallel frame rails. The drive unit housing 150 is suspended within the equipment cavity 314 such that the drive unit housing 150 is positioned between the first and second groups of suspension components 320, 322.

The plurality of suspension components may include a first strut member 324 that is coupled to the first frame rail, and a second strut member 326 that is coupled to the second frame rail 306 such that a horizontal gap 328 is defined along the transverse axis 312 between the first strut member 324 and the second strut member 326 within the equipment cavity 314. The drive unit housing 150 is suspended within the equipment cavity 314 and positioned within the gap defined between the first strut member 324 and the second strut member 326. In addition, the distance between the first and second frame rails 304, 306 defines a cavity width 330 of the equipment cavity measured along the transverse axis 312. The drive unit housing 150 may include a housing width 332 that is defined between the first and second sides 154, 156 measured the transverse axis 312 that is less than the cavity width 330.

Figure 44:
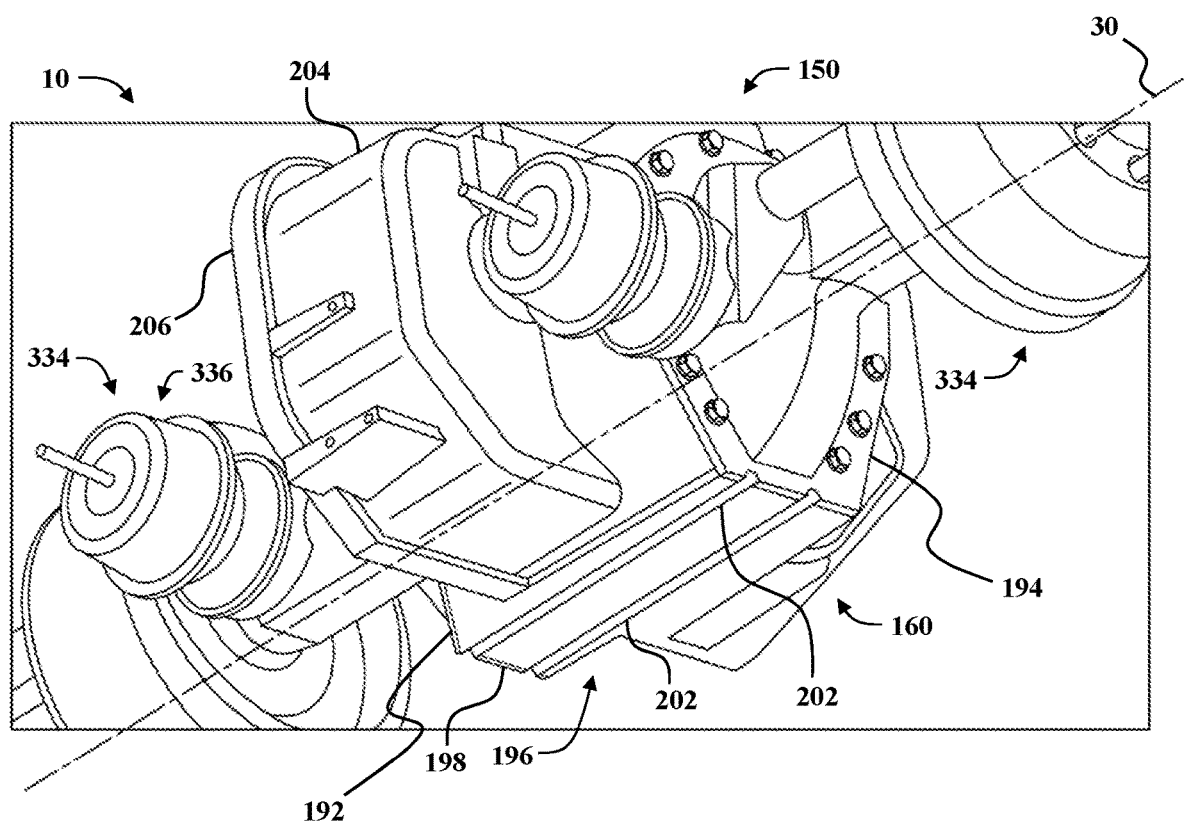
FIG. 44 is a perspective view of the drive unit housing shown in FIG. 32 with a section of a lower portion of the drive unit housing removed.
Figure 45:
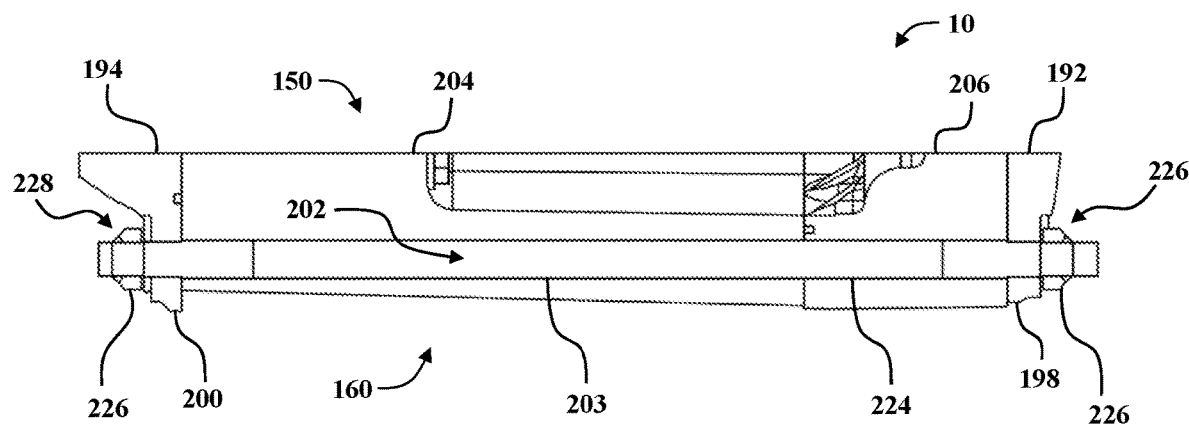
FIG. 45 is a sectional view of the lower portion of the drive unit shown in FIG. 32 taken along section line 45-45.
Figure 46:
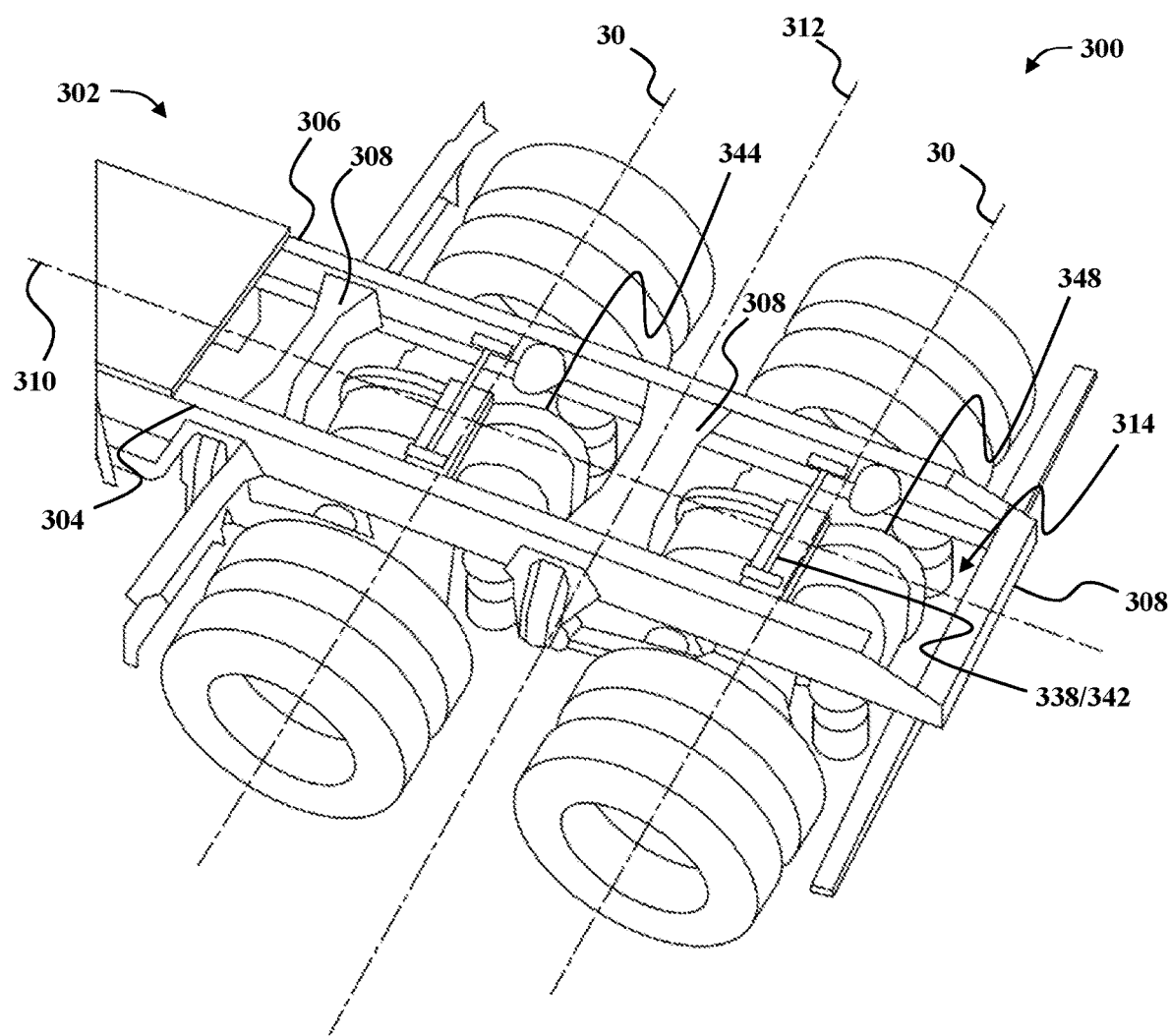
FIG. 46 is a perspective view of a vehicle including a frame rail assembly and a pair of the axle assemblies shown in FIG. 1, according to an embodiment of the present invention.
Figure 47:
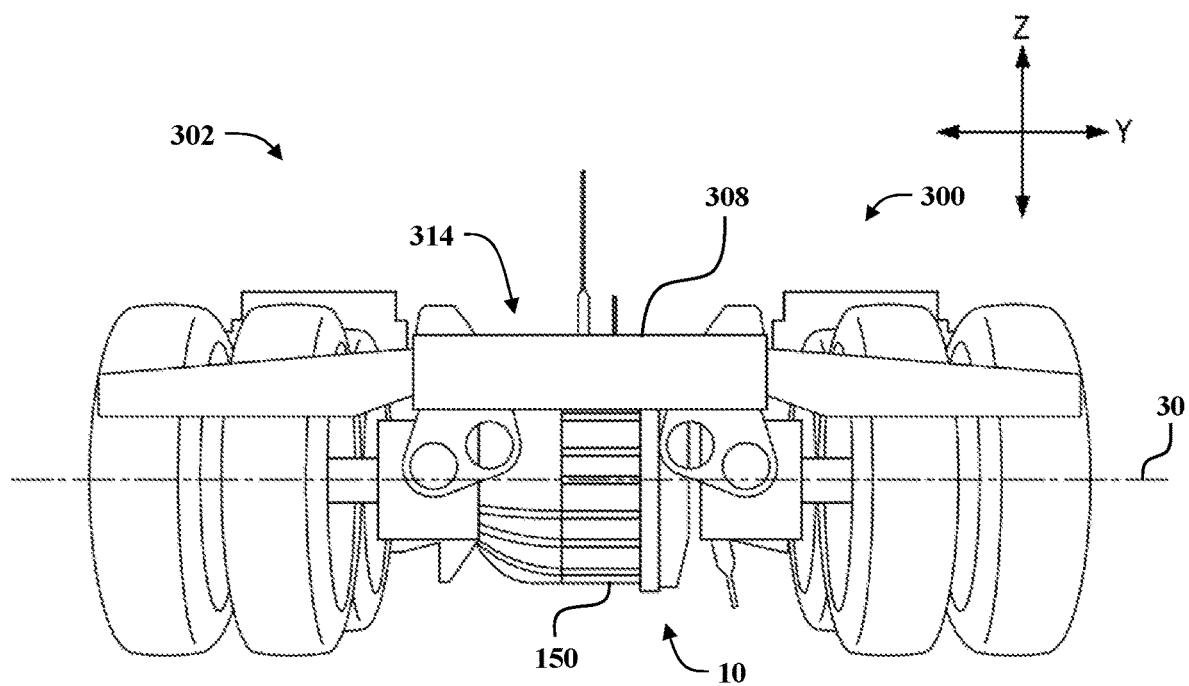
FIG. 47 is an elevation view of the vehicle shown in FIG. 46.

In one embodiment, the axle assembly 10 may include the drive unit housing 150, the two axle tubes 230, 232, and two wheel ends 334. Each of the axle tubes 230, 232 is coupled to the drive unit housing 150 at a proximal end and to one of the wheel ends 334 at a distal end. The axle tubes 230, 232 protrude along the axle centerline 24 from opposing sides of the drive unit housing 150. The axle shafts 26, 28 are disposed in each corresponding axle tube 230, 232 coaxial with the axle centerline 24. As shown in FIG. 44, each axle shaft 26, 28 is coupled to one of the wheel ends 334 to transfer torque to respective wheels. The wheels are coupled to the wheel ends 334 and rotate about the axle centerline 24 relative to the drive unit housing 150. Each of the wheel ends 334 may include a hub assembly. For example, the hub assembly may be a full-float wheel hub, a semi-float wheel hub, a planetary reduction hub, or a portal hub.

In the illustrated embodiment, the axle assembly 10 includes the drive unit housing 150 with the reduction assembly 12 positioned within the drive unit housing 150, and the pair of axle shafts 26, 28 are coupled to the reduction assembly 12 and extending radially outwardly from opposite ends of the reduction assembly 12 along the first axis of rotation 30. The axle assembly 10 may also include a pair of wheel ends 334 and a braking assembly 336 that is coupled to each wheel end 334. Each wheel end 334 is coupled to an end of a corresponding axle shaft 26, 28. The braking assembly 336 may include an air cylinder, brake hoses, brake drums, brake rotors, brake calipers, and the like.

In one embodiment, the axle assembly 10 may include a mounting assemblies 338 extending outwardly from opposite ends of the drive unit housing 150. Each mounting assembly 338 includes a suspension mounting location for mounting a suspension system of a vehicle to the axle assembly 10. In addition, the drive unit housing 150 includes a support bracket 340 (shown in FIG. 40) that is coupled to the upper portion 158 of the drive unit housing 150. The vehicle assembly 300 includes a stabilizer bar 342 that is pivotably coupled to one of the parallel frame rails 304, 306, and is pivotably coupled to the support bracket 340 of the drive unit housing 150 for suspending the drive unit housing 150 within the equipment cavity 314 and beneath the cross beams. For example, in one embodiment, the vehicle assembly includes a panhard rod that is coupled to the support bracket 340 and to the first frame rail 304 (shown in FIG. 48) for supporting the drive unit housing 150 from the frame rail assembly 302.

Referring to FIGS. 46-49, in the illustrated embodiment, the axle assembly 10 is adapted for use with a vehicle 300 including a frame rail assembly 302 and a wheel assembly that is coupled to the axle assembly 10 for supporting the axle assembly 10 from a ground surface. The wheel assembly includes one or more wheels that are coupled to each wheel end 334 of the axle assembly 10 to support the vehicle and transfer motive power from the axle assembly 10 to the ground surface. A mounting assembly 338 is coupled to the frame rail assembly 302 and to the axle assembly 10 such that the frame rail assembly 302 is supported by the axle assembly 10 and the wheel assembly from the ground surface. The mounting assembly 338 may include suspension arms that are coupled to one or more suspension mounting locations on the axle assembly 10. The vehicle may be an electric vehicle or a hybrid vehicle with an electric motor and internal combustion generator/motor. Advantageously, the mounting assembly 338 may be configured to retrofit the axle assembly 10 to a vehicle. For example, a frame rail truck originally equipped with a traditional axle assembly may utilize the axle assembly 10 in place of the traditional axle assembly.

Figure 48:
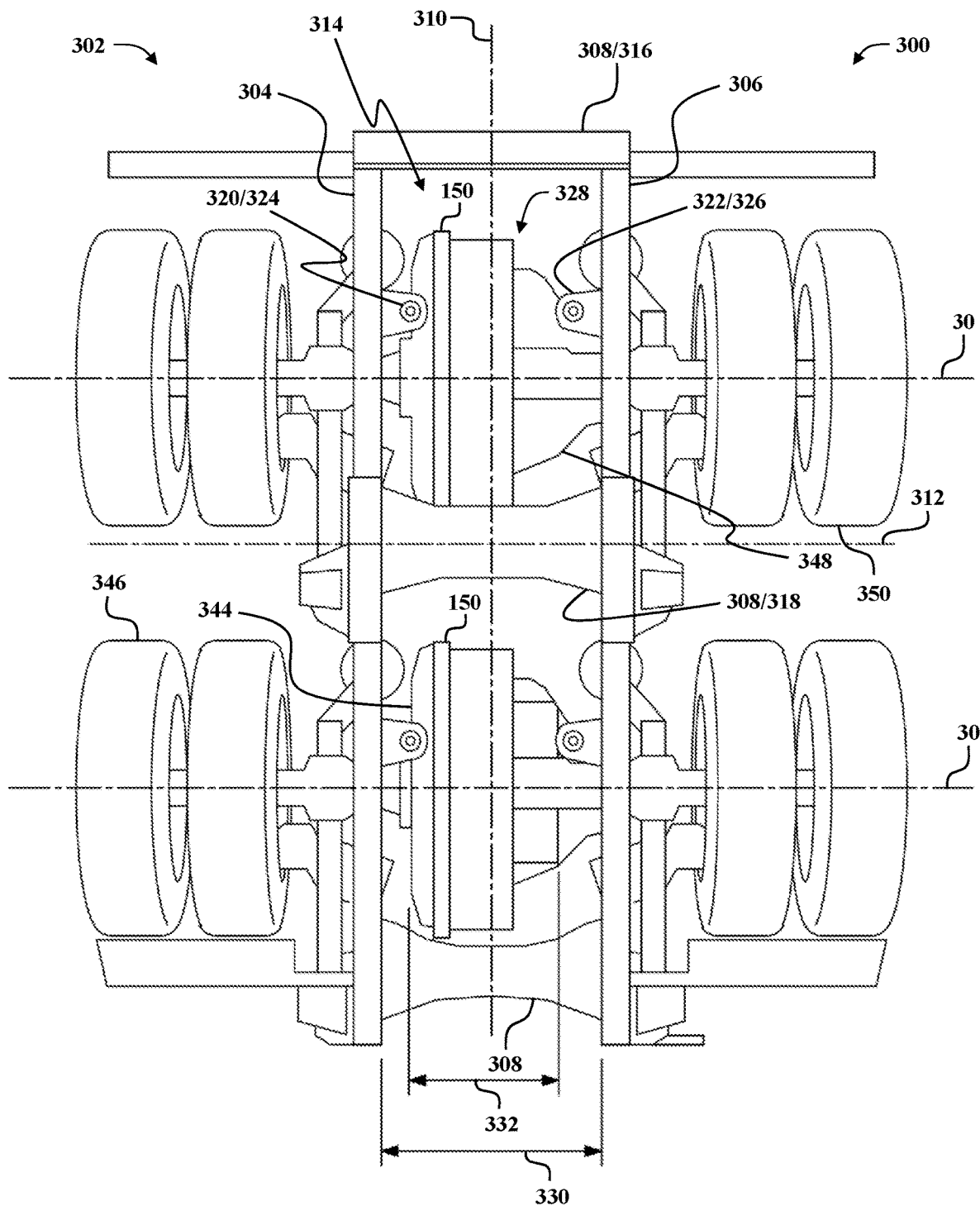
FIG. 48 is a top view of the vehicle shown in FIG. 46.
Figure 49:
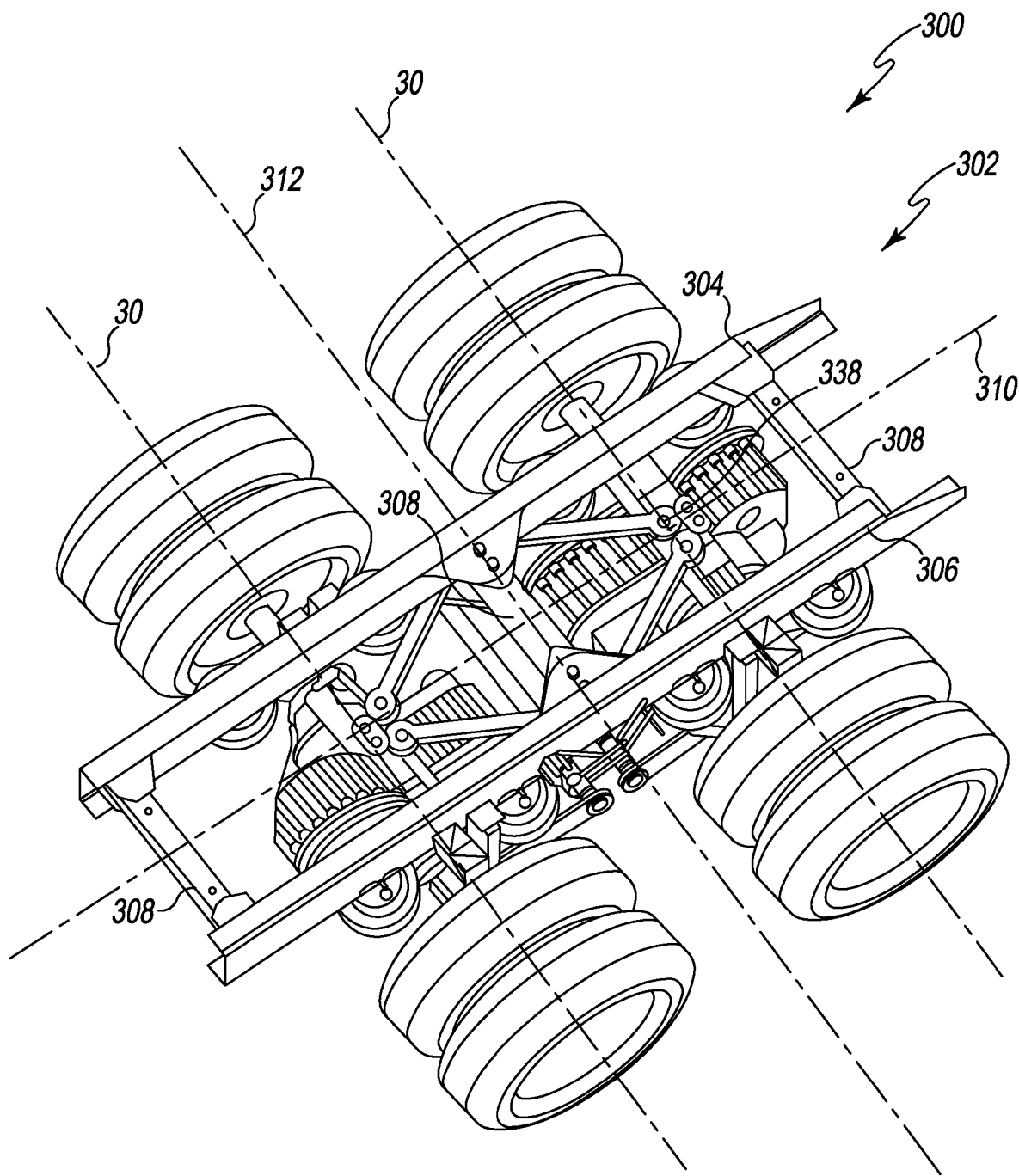
FIG. 49 is a perspective view of a vehicle including a frame rail assembly and a pair of the axle assemblies shown in FIG. 1, according to an embodiment of the present invention.

In the illustrated embodiment, the vehicle 300 may include a plurality of axle assemblies 10. For example, as shown in FIG. 48, the vehicle may include a first electric axle assembly 344 that is coupled to a first wheel assembly 346, and a second electric axle assembly 348 that is coupled to a second wheel assembly 350. In one embodiment, as shown in FIG. 48, the first electric axle assembly 344 and the second electric axle assembly 348 are orientated in the same direction. Each of the first and second electric axle assemblies 344, 348 include a panhard rod that is orientated substantially parallel to the axle shafts 26, 28 and coupled between the cross beams 308 and the vehicle frame rail assembly 302 for supporting each of the axle assemblies 344, 348 from the vehicle frame rail assembly 302. In addition, as shown in FIG. 49, each of the first and second electric axle assemblies 344, 348 include the first electric machine 14 and the second electric machine 16 orientated in the same position with respect to the corresponding axle shafts 26, 28. For example, as shown in FIG. 49, each of the first and second axle assemblies 344, 348 include the second electric machine 16 spaced a different vertical distance from the axle shafts 26, 28 than the first electric machine 14.

In another embodiment, the first electric axle assembly 344 and the second electric axle assembly 348 are oriented in opposing directions. For example, as shown in FIG. 49, the first electric axle assembly 344 includes the electric machines positioned adjacent the first frame rail 304, and the second electric axle assembly 348 includes the electric machines positioned adjacent the opposite second frame rail 306. In addition, each of the first and second electric axle assemblies 344, 348 may include a rod assembly 338 coupled between a corresponding cross beams 308 and the vehicle frame rail assembly 302 for supporting each of the electric axle assemblies 344, 348 from the vehicle frame rail assembly 302. Each rod assembly 338 includes a pair of support rods extending outwardly from the drive unit housing 150 in a "v"-shape orientation. Each support rod extends between the support bracket 340 and the vehicle frame rail assembly 302, and is orientated at an oblique angle with respect to the first axis of rotation 30. In the illustrated embodiment, each rod assembly 338 is coupled to a common cross beams 308.

In one embodiment, the first electric axle assembly 344 and the second electric axle assembly 348 may be oriented in the same direction, with the first electric axle assembly 344 having electric machines having a different orientation with respect to the axle shafts 26, 28 than the electric machines of the second electric axle assembly 348. For example, the first electric axle assembly 344 includes the first electric machine 14 spaced a farther vertical distance from the axle shafts 26, 28 than the second electric machine 16, and the second electric axle assembly 348 includes the second electric machine 16 spaced a farther vertical distance from the axle shafts 26, 28 than the first electric machine 14.

In the illustrated embodiment, the axle assembly 10 is adapted for use with vehicles having a chassis including a frame rail system upon which a body and other equipment is mounted. Advantageously, the axle assembly 10 may be configured to retrofit existing vehicles and fit within existing frame rails that include existing suspension components such as springs, dampers, and trailing arms; and existing brake components such as air cylinders, brake calipers, brake rotors, brake drums, brake hoses, and the like. The electric axle assembly includes a reduction assembly that is driven by a pair of electric machines and is selectively shiftable between a first ratio and a second ratio to improve launch and velocity performance of the vehicle.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. An axle assembly comprising:
    a first axle shaft orientated along a first axis of rotation;
    a second axle shaft orientated along said first axis of rotation with said first and second axle shafts extending in opposite directions;
    a first electric machine orientated along a second axis of rotation substantially parallel with said first axis of rotation;
    a second electric machine spaced from said first electric machine and orientated along a third axis of rotation substantially parallel with said first axis of rotation;
    a common gear reduction rotatable about a fourth axis of rotation and driven by said first and second electric machines;
    a differential gear set disposed about said first axis of rotation and coupled to and driven by said common gear reduction to transfer rotational torque from said first and second electric machines to said first and second axle shafts; and
    a speed change mechanism (i) orientated between said first electric machine and said second electric machine and (ii) coupled between said common gear reduction and said differential gear set to change the rotational torque transferred to said first and second axle shafts, said speed change mechanism including:
        a reduction gear set rotatable about said first axis of rotation and driven by said common gear reduction; and
        an output gear set rotatable about a fifth axis of rotation substantially parallel with said first axis of rotation and driven by said reduction gear set.

2. The axle assembly of claim 1, further comprising a planetary gear set coupled between said speed change mechanism and said differential gear set for driving said differential gear set.

3. The axle assembly of claim 2, wherein said planetary gear set includes a planetary gear shaft coupled to said reduction gear set and a sun gear coupled to said planetary gear shaft.

4. The axle assembly of claim 1, wherein said second axis of rotation of said first electric machine and said third axis of rotation of said second electric machine are orientated at a same radial distance from said first axis of rotation, said second axis of rotation is spaced a first horizontal distance from said first axis of rotation and said third axis of rotation is spaced a second horizontal distance from said first axis of rotation that is different than the first horizontal distance.

5. The axle assembly of claim 4, wherein said second axis of rotation of said first electric machine is spaced a first vertical distance from said first axis of rotation and third axis of rotation of said second electric machine is spaced a second vertical distance from said first axis of rotation that is different than the first vertical distance.

6. The axle assembly of claim 5, wherein said fifth axis of rotation of said output gear set is spaced a different radial distance from said second axis of rotation of said first electric machine than from said third axis of rotation of said second electric machine.

7. The axle assembly of claim 1, wherein said first electric machine and said second electric machine are orientated in a same direction.

8. The axle assembly of claim 7, wherein said common gear reduction is positioned at one end of said first and second electric machines and said differential gear set is positioned at an opposite end of said first and second electric machines.

9. The axle assembly of claim 1, wherein said reduction gear set includes:
    a first reduction gear coupled to said output gear set;
    a second reduction gear coupled to said output gear set; and
    a shift mechanism positioned between said first reduction gear and said second reduction gear and configured to selectively engage said first reduction gear and said second reduction gear.

10. The axle assembly of claim 9, wherein said output gear set includes a pair of output gears coupled to said first and second reduction gears.

11. The axle assembly of claim 10, wherein said output gear set includes an output pinion coupled to said differential gear set.

12. The axle assembly of claim 11, wherein said speed change mechanism includes:
    a second output gear set rotatable about a sixth axis of rotation substantially parallel with said first axis of rotation and driven by said reduction gear set, said second output gear set including a second output pinion coupled to said differential gear set.

13. The axle assembly of claim 12, wherein said second output gear set includes one output gear coupled to said second reduction gear.

14. The axle assembly of claim 1, wherein said common gear reduction includes an input shaft and an input drive wheel fixedly coupled to said input shaft, said input drive wheel engaging said first and second electric machines for transferring the rotational torque from said first and second electric machines to said input shaft, said input shaft orientated coaxially with said first axis of rotation and including an inner surface that defines a input shaft bore configured to receive said first axle shaft therethrough.

15. The axle assembly of claim 14, wherein said reduction gear set includes:
    a first reduction gear and a second reduction gear rotatable about said input shaft; and
    a shift mechanism coupled to said input shaft and positioned between said first reduction gear and said second reduction gear for selectively transferring torque from said input shaft to said first reduction gear and said second reduction gear.

16. The axle assembly of claim 15, wherein said shift mechanism includes a synchronizer coupled to said input shaft.

17. The axle assembly of claim 15, wherein said output gear set includes:
    an output shaft rotatable about said fifth axis of rotation; and a pair of output gears fixedly coupled to said output shaft, each output gear coupled to a corresponding reduction gear.

18. The axle assembly of claim 17, wherein said output gear set includes an output pinion fixedly coupled to said output shaft, said output pinion coupled to said differential gear set for transferring torque from said output shaft to said differential gear set.

19. The axle assembly of claim 17, further comprising a planetary gear set coupled between said speed change mechanism and said differential gear set for driving said differential gear set, said planetary gear set including:
- a planetary gear shaft orientated coaxially with said first axis of rotation and rotatable about said input shaft, said planetary gear shaft extending between a first shaft end and a second shaft end, said first shaft end fixedly coupled to said second reduction gear; and
- a sun gear fixedly coupled to said second shaft end of said planetary gear shaft.

\* \* \* \* \*